United States Patent [19]

Scott et al.

[11] Patent Number: 5,025,471
[45] Date of Patent: Jun. 18, 1991

[54] METHOD AND APPARATUS FOR EXTRACTING INFORMATION-BEARING PORTIONS OF A SIGNAL FOR RECOGNIZING VARYING INSTANCES OF SIMILAR PATTERNS

[75] Inventors: Brian L. Scott; Lloyd A. Smith; J. Mark Newell; Bruce E. Balentine; Lisan S. Lin, all of Denton, Tex.

[73] Assignee: Scott Instruments Corporation, Denton, Tex.

[21] Appl. No.: 389,682

[22] Filed: Aug. 4, 1989

[51] Int. Cl.$^5$ .............................. G10L 5/00
[52] U.S. Cl. .................. 381/43; 364/513.5; 381/41
[58] Field of Search .................... 381/29–43; 364/513.5

[56] References Cited

U.S. PATENT DOCUMENTS

| | | |
|---|---|---|
| 4,161,033 | 7/1979 | Martinson . |
| 4,230,906 | 10/1980 | Davis . |
| 4,267,407 | 5/1981 | Schindler et al. . |
| 4,373,191 | 2/1983 | Fette et al. . |
| 4,388,491 | 6/1983 | Ohta et al. . |
| 4,426,551 | 1/1984 | Komatsu et al. . |
| 4,435,832 | 3/1984 | Asada et al. . |
| 4,441,200 | 4/1984 | Fette et al. . |
| 4,672,667 | 6/1987 | Scott et al. ............... 381/41 |
| 4,700,360 | 10/1987 | Visser . |

OTHER PUBLICATIONS

The American Journal of Psychology, vol. LXI, No. 1, pp. 1–20, Licklider et al., Jan., 1948.
Speech Analysis Synthesis and Perception, Second Edition, pp. 192–199, Flanagan, 1972.
Pitch Determination of Speech Signals, pp. 373–383, Hess, 1983.

Primary Examiner—Emanuel S. Kemeny
Attorney, Agent, or Firm—Harold E. Meier

[57] ABSTRACT

Speech signals are analyzed by correlating a sequence of samples to derive a sliding average magnitude difference function (SAMDF) whereby histograms are formed which are compressed and normalized to form histogram sequences representing the speech signal for comparison and recognition.

38 Claims, 10 Drawing Sheets

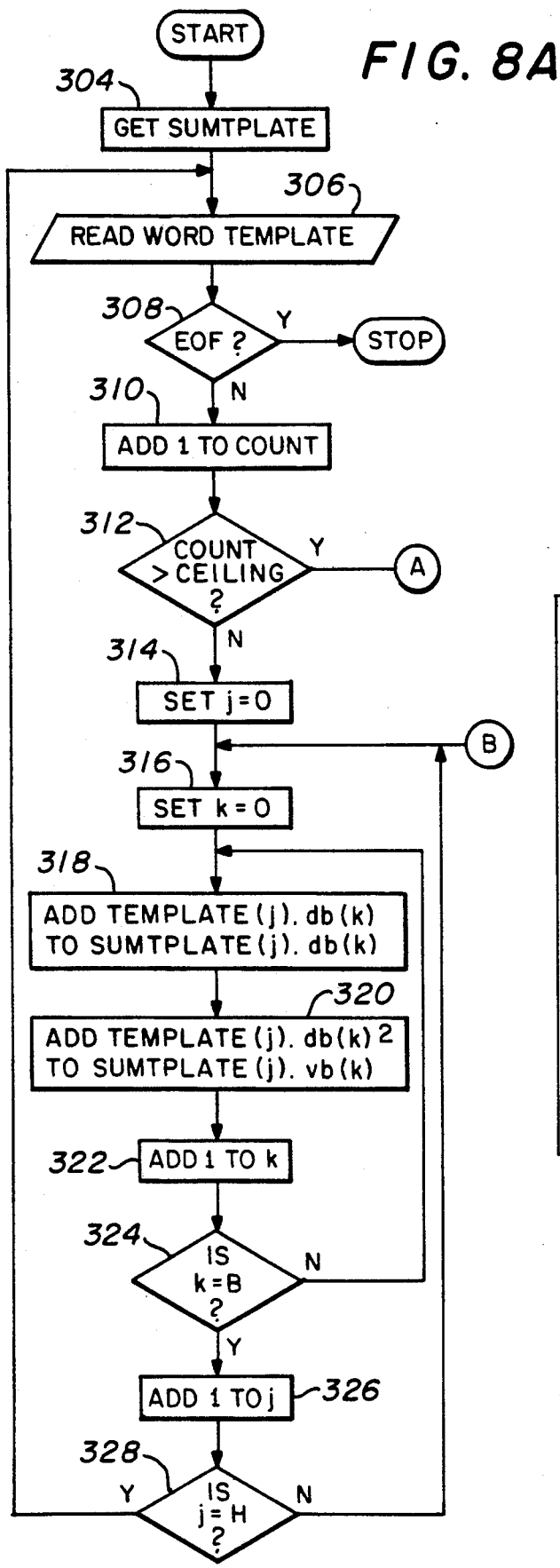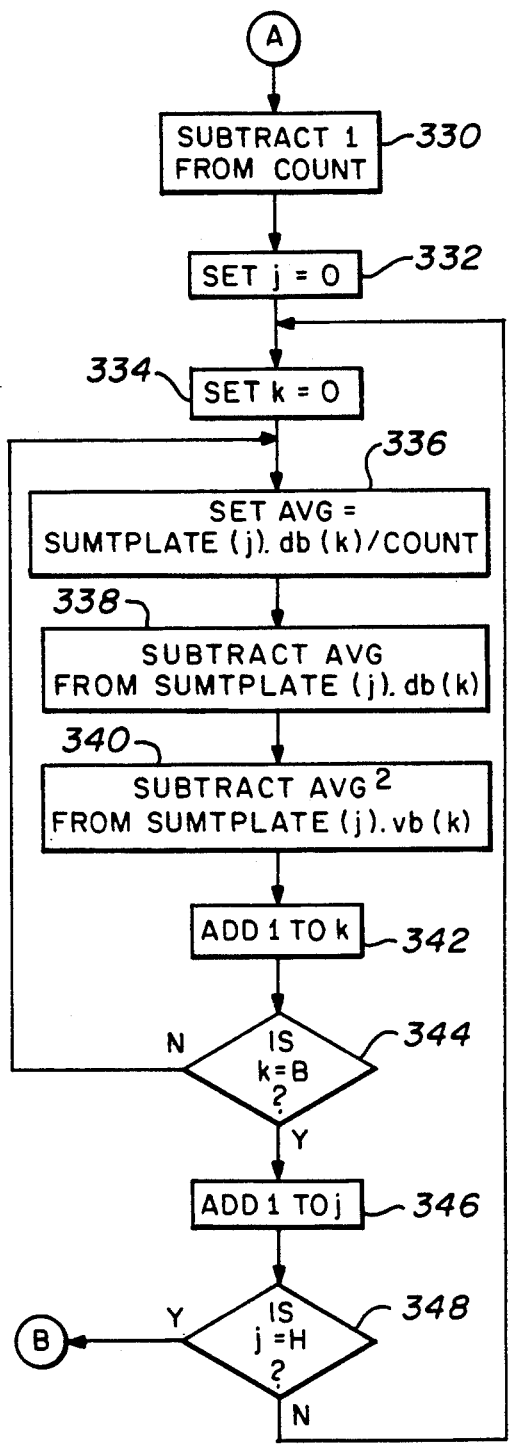
FIG. 8A
FIG. 8B

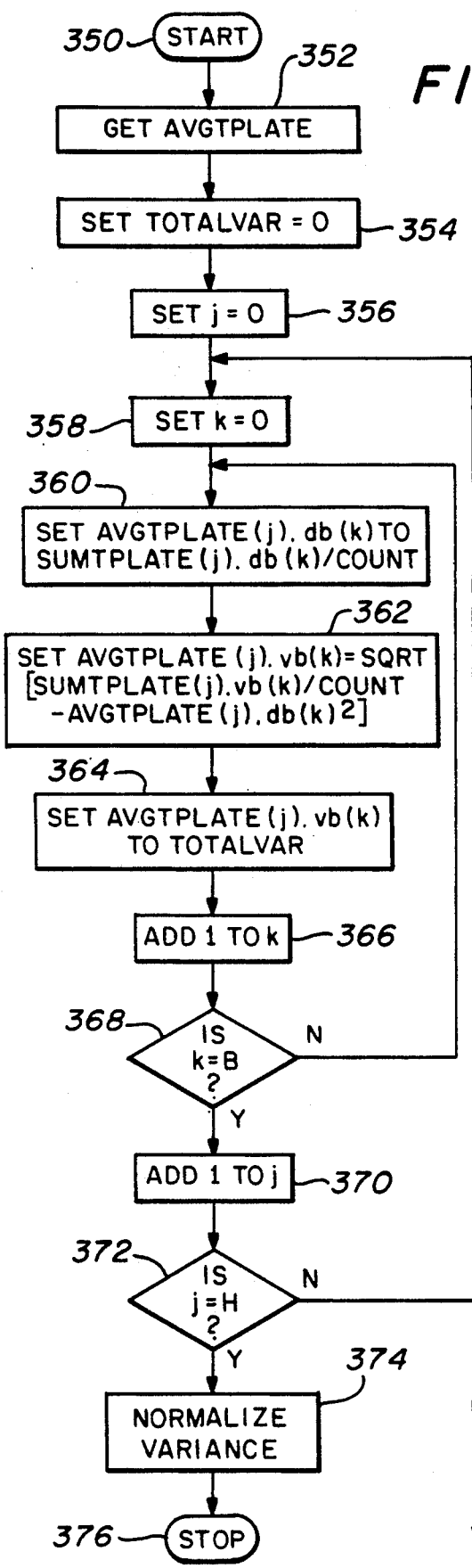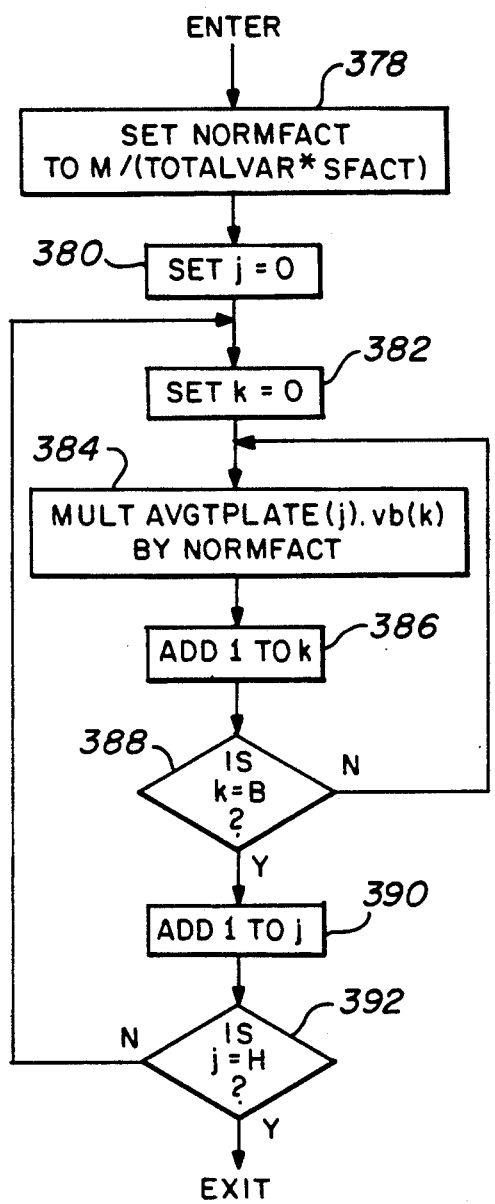
FIG. 9A
FIG. 9B
B = # OF BUCKETS
H = # OF HISTOGRAMS
M = TOTAL POSSIBLE VARIANCE
db = DATA BUCKET ARRAY
vb = VARIANCE BUCKET ARRAY

METHOD AND APPARATUS FOR EXTRACTING INFORMATION-BEARING PORTIONS OF A SIGNAL FOR RECOGNIZING VARYING INSTANCES OF SIMILAR PATTERNS

TECHNICAL FIELD

The present invention relates to the correlation of two input functions that are source independent. In particular, the invention relates to a method and apparatus for generating recognition of speech signals independent of the speaker. The method and apparatus of the present invention normalizes the time, amplitude and spectral variations of speech signals among speakers for speaker-independent speech recognition.

BACKGROUND OF THE INVENTION

Signal processing techniques for estimating characteristic parameters of a signal or for transforming a signal into a more desirable form are well known. Such techniques are advantageously utilized in such diverse fields as acoustics, data communications, radar and speech recognition. For example only, in a speech recognition system, a speech signal is processed to extract characteristic information encoded in frequency, amplitude and time. This information is then processed to extract various recognizable features in the speech signal that are used to aid in the recognition process. Since the performance of the overall speech recognition system is largely dependent on the accuracy of the original extraction process, highly efficient signal processing techniques are required.

Speech recognition systems have evolved a great deal over the past twenty (20) years. Vocabulary sizes have increased, connected speech capabilities have improved, and speaker-independent systems have appeared in the commercial market. Of these three embodiments, speaker-independent recognition capabilities have improved the least amount. Vocabulary sizes are typically restricted to less than twenty (20) words. There are no commercially available systems capable of handling connected, speaker-independent word recognition.

All of the problems in machine recognition of speech can be described as problems of normalization. This applies to the amplitude, spectrum, and temporal attributes of speech. The variability within a single speaker has proven to be sufficiently difficult for machines to contend with, let alone the variability among speakers.

Thus, automatic speech recognition (ASR) has consistently proven to be one of the more difficult tasks that digital computers have been asked to do. Vast resources have been dedicated to this problem over the past four decades, and yet, even today, there is no consensus among researchers as to the "right" way to do any of the major tasks necessary for the automatic recognition of speech.

One of the most difficult facets of speech recognition is speaker independence. The variations in vocal quality and dialect across speakers is often much greater than the distinctions across words.

The three major tasks involved in speech recognition are: (1) signal processing, (2) training, and (3) matching.

In psychological terms, these three tasks might be called sensing, learning, and perceiving. All recognition systems perform these three basic tasks. However, the specific functions of these three tasks may vary from one recognition system to another. For example, a recognizer that uses linear time normalization does its normalization during the signal processing task exclusively. A recognizer using dynamic time warping (DTW) does its normalization during both the training and matching tasks. Normalization is accomplished based upon a reference and the reference is what determines where normalization belongs in the recognition process. Linear time normalization uses a fixed number of frames, or histograms, as a reference whereas DTW uses a word template as a reference. Since the number of frames used with linear time normalization is predetermined, this function must be done prior to training and matching. Since DTW requires a learned reference, its time normalization cannot precede training and matching.

Philosophically, the issue being alluded to above is the issue of nature versus nurture. In other words, which of the functions necessary to speech recognition should be incorporated into the signal processing (sensory) phase of the process, and which should be learned?

In the development of the recognizer described herein, the position is taken that speech normalization is a sensory process rather than a perceptual one. This is congruent with current thought on language development in children. Recent research has shown that infants are born with the ability to discriminate among phonetic categories regardless of non-phonetic variables such as loudness and pitch.

In commonly assigned copending U.S. Ser. No. 372,230, filed June 26, 1989, a method and apparatus is described for generating a signal transformation that retains a substantial part of the informational content of the original signal required for speech processing applications. As described therein, the transformation is generated by converting all or part of the original signal into a sequence of data samples, selecting a reference position along a first subpart of the sequence and generating a frame or histogram for the referenced position according to the sliding average magnitude difference function (SAMDF). Thereafter, a referenced position along a second sub-part of the sequence is selected and an additional histogram is generated for this referenced position using the SAMDF function. The plurality of frames or histograms generated in this fashion comprise the transformation. This transformation is then used as the signal itself in signal processing applications.

The present invention describes a method and apparatus for normalizing the amPlitude and spectral variations in signals related to such fields as acoustics, data communications, radar and speech recognition. While the invention relates to each of those fields, it will be disclosed herein, in respect to the preferred embodiment, as a method and apParatus for normalizing the time, amplitude and spectral variations among speakers for speaker-independent word and connected speech recognition. The two weighted histograms, generated as disclosed in commonly assigned U.S. Ser. No. 372,230, and incorporated herein by reference, are utilized as the output signals from the first stage of the present invention.

One of the SAMDF histograms is used in the second stage as a broadband digitized input signal while the other is used as a differentiated and infinitely peak-clipped input signal. The resulting signals serve as low pass and high pass versions of the input signal to be processed. Also, in the second stage of the invention, three exponentially related "channels" are derived from the two SAMDF function signals. The signals are processed in thirty-two histograms per word or utterance with nineteen data buckets or measurements per histogram. The first channel samples the input signal four measurements at a time from the infinitely peak-clipped version of the input signal. The second and third channels are derived from the broadband version of the input signal. The second channel is derived by compressing the first eight measurements into four measurements by averaging adjacent measurements. The third channel is derived by compressing sixteen measurements of the broadband representation into four measurements by averaging four adjacent measurements at a time. Thus, the output of the three channels from the averaging networks each includes four consecutive measurements. This second stage of the invention results in three exponentially related channels of information about the signal, each consisting of four measurements. The three channels are said to be "logarithmically spaced" and emphasize spectral variations in the input signal.

The third stage derives a fourth channel that consists of average amplitude measurements from each of the three logarithmically spaced channels discussed in relation to the second stage, plus a global average taken across all three of the channels. Thus, the fourth channel consists of four measurements, or "buckets", representing the average signal amplitude of each of the three logarithmically spaced channels and the global amplitude. For the purposes of this application, a "channel" is defined as a set of related measurements that are operated on in a like manner.

The preferred embodiment of the present invention relates to the recognition of an isolated word or phrase meaning that each utterance recognized by the system must be preceded and followed by a short period of silence. The utterance is captured and framed by a process designed to determine beginning and ending points of the utterance. This process is usually called an end point algorithm and in the fourth stage of the present invention, the beginning and end point of the utterance is determined.

Post-end point processing and normalization occurs in the fifth stage of the present invention. In this stage, both time normalization and amplitude normalization of the data signal is accomplished.

In the sixth stage, matching, training and adaptation is performed. The present invention recognizes input speech by matching the input "test" utterance against the vocabulary templates. The template yielding the lowest score is returned by the system as being the recognized utterance, although, as is well-known in the art, the recognition choice may be "rejected" if the score is too high or if the second best match score is too close to the best score.

The isolated word recognizer described herein is a template based system, meaning that the system matches input (or "unknown") utterances against a set of prototypes, or templates, representing the utterances accepted by the system (the "vocabulary"). In the preferred embodiment, one composite template is formed for each utterance in the vocabulary. A composite template is formed by merging a number of examples of the specified utterance spoken by a number of speakers. This composite template may then be "adapted" by a process described hereafter. A novel aspect of the present invention is the maintenance of two forms of the composite template for each utterance: the "summed" template that enables the system to add training to any template and the "averaged" template, generated from the summed template, that is the form matched against the unknown utterance.

When operating in the "adapt" mode, the present invention adjusts the vocabulary templates to the speaker. Adaptation is controlled using feedback as to the recognition accuracy. A novel feature of the adaptation process is the subtraction of the test template from intruding vocabulary templates.

The word "template" is normally used to mean "model". A true template represents the spaces between events. So long as comparisons fall within the variances (whether a signal is present or not), such comparisons "fall through the template". This means that in speech recognition, phonemes can be missing without creating adverse results in the speech recognition system. However, information which falls outside of the variance template presents evidence against a match.

One important feature of the invention is the logarithmic spacing of the channels, each of which analyzes the same number of data buckets or measurements, but each of which, through compression, encompasses a wider range of data buckets than the previous channel. Another important feature of the invention is the signal amplitude normalization of all four of the channels. Still another important feature of the present invention is the time normalization of all four of the channel signals using not only beginning and end points but also a center reference point.

Thus, in the present invention, linear normalization forces peaks on the four channels. Speech recognition with the present template is also related to the spacing between the peaks. Thus, the information bearing portion of the signal is the area between peaks. Each data bucket or measurement is compared to the average template peaks and then variances are subtracted to give a point score (per time increment) and the total score for one word is the sum of the points for all time increments.

SUMMARY OF THE INVENTION

Thus, the present invention relates to a method for extracting information-bearing portions of histogram wave form signals derived by calculating a sliding average magnitude difference function (SAMDF) for recognizing varying instances of similar patterns comprising the steps of coupling said signal to n separate signal data channels; logarithmically spacing the data in each of said n channels from channel-to-channel; and time and amplitude normalizing the data in each channel to generate a data template containing said information-bearing portions of said signal.

The invention also relates to apparatus for extracting information-bearing portions of signals derived by calculating a sliding average magnitude difference function (SAMDF) for recognizing varying instances of similar patterns comprising means for coupling said signal to n separate signal data channels; means for logarithmically spacing the data in each of said n channels from channel-to-channel; and means for time and amplitude normalizing the data in each channel to generate a data template containing said information-bearing portions of said signal.

BRIEF DESCRIPTION OF THE DRAWINGS

For a more complete understanding of the present invention and the advantages thereof, reference is now made to the following description in conjunction with the accompanying drawings in which:

FIGS. 8A and 8B respectively illustrate the process of creating or updating a summed template and reducing the train count for a given utterance during the training process;

FIGS. 9A and 9B illustrate the process of calculating an averaged template and normalizing variances from a summed template; the averaged template is the template that is to be matched against the unknown utterance;

DETAILED DESCRIPTION OF THE DRAWINGS

Again, while the present invention relates a method and apparatus for normalizing the time, amplitude and spectral variations in signals related to such fields as acoustics, data communications, radar and speech recognition, it will be disclosed herein in respect to the preferred embodiment as a method and apparatus for normalizing the time, amplitude and spectral variations among speakers for speaker-independent word and connected speech recognition.

Figure 1:
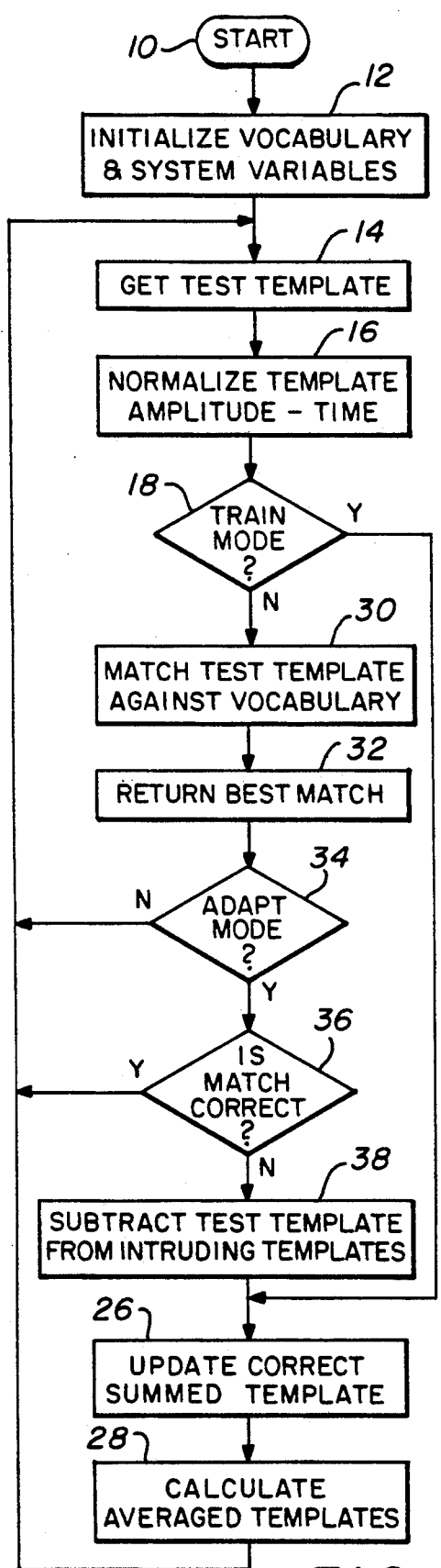
FIG. 1 is a flow chart diagram of the overall system operation loop.

Referring now to the drawings, FIG. 1 is a flow chart illustrating the basic operation loop of the present invention. After start-up of the system at 10, the system, at step 12, initializes various parameters and variables used to perform training and recognition. These include both the beginning and end point parameters, described under "end point algorithm" hereafter, and recognition score parameters that may be used in determining whether to accept or reject recognitions.

Following initialization at Step 12, the system operates in a continuous loop, monitoring the audio line for acoustic input. Such input is detected and captured by the end point routine, described hereafter and illustrated in FIGS. 3A and 3B. The function of the end point routine is represented in FIG. 1 as Step 14. Step 16 then effects time and amplitude normalization of the captured utterance. This process, as described hereafter, creates a "template" representing the utterance. Following creation of the template, step 18 checks the operation mode of the system.

If the system is in the "train" mode, step 26 updates the summed template corresponding to the captured utterance and Step 28 calculates a new averaged template. This process is described hereafter under "TRAINING" and is illustrated in FIGS. 8A and 8B. Following training, control returns to the top of the operation loop at Step 14.

Figure 10:
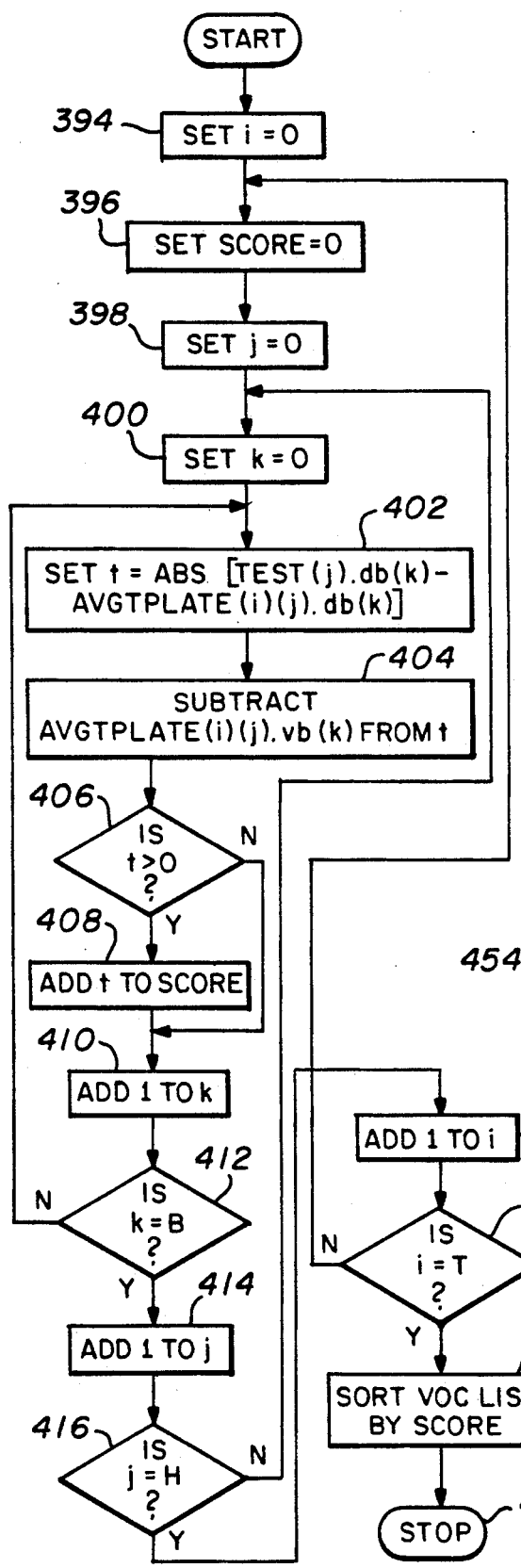
FIG. 10 illustrates the process of matching a test template against the vocabulary or averaged template.

If the system is not in train mode, the captured utterance or test template is matched against the system vocabulary template at Step 30. The matching process is described hereafter under "MATCHING FOR RECOGNITION" and is illustrated in FIG. 10. Step 32 returns the best match as the recognized word. As is well known in the art, the match may be "rejected", thus indicating "no recognition", if the score is too high or if the difference between the best score and the second best score is too close.

Figure 11:
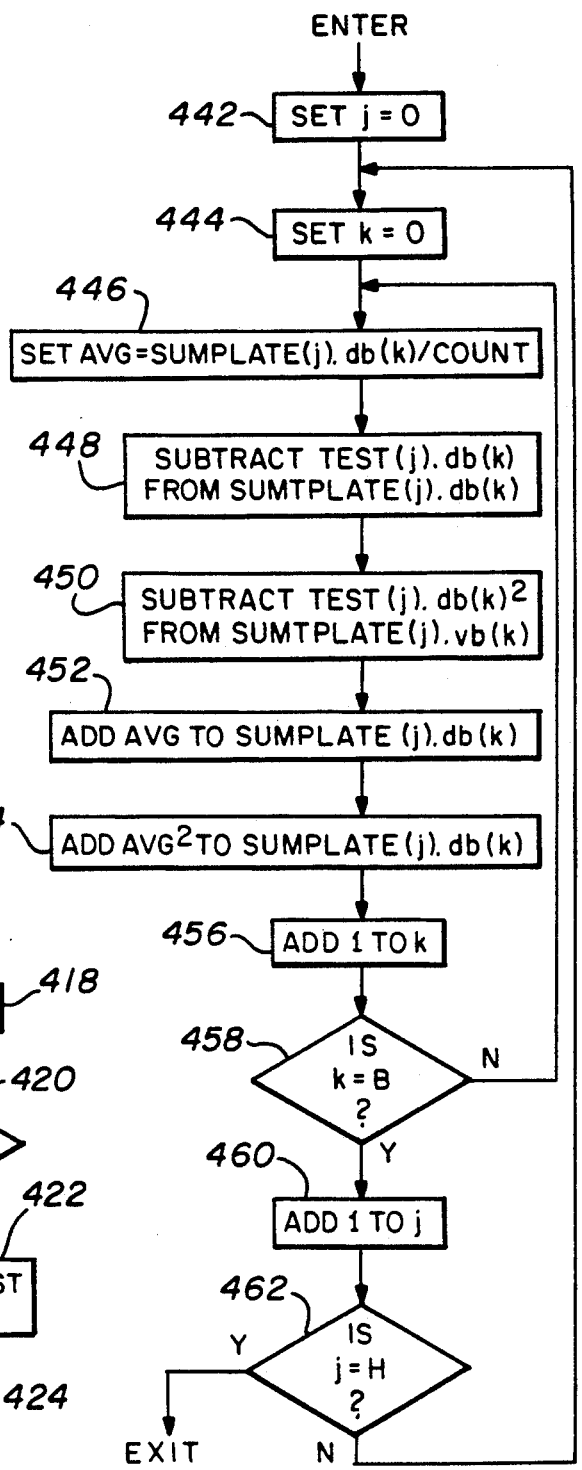
FIG. 11 illustrates the subtraction of the test template from intruding vocabulary templates during the adaptation process to adjust the vocabulary templates to the speaker.

If at Step 34, the system is not in the adapt mode described hereafter, under "ADAPTATION", control returns to the top of the loop at Step 14. If the system is in the adapt mode, Step 36 checks the accuracy of the recognition. If the recognition was correct, control returns to Step 14; if the recognition was wrong or was rejected, Step 38 subtracts the test template from the vocabulary templates whose match scores were too close to (or less than) that of the correct vocabulary template. Template subtraction is a novel feature of the system. It is described hereafter under "ADAPTATION" and is illustrated in FIG. 11.

Following template subtraction, the test template is used to update the summed template as shown at Step 26. In Step 28, averaged templates are calculated for the newly updated correct template as well as for templates which were targets of subtraction. Control then returns to step 14 to process the next token.

PRE-END POINT PROCESSING AND NORMALIZATION

Figure 2:
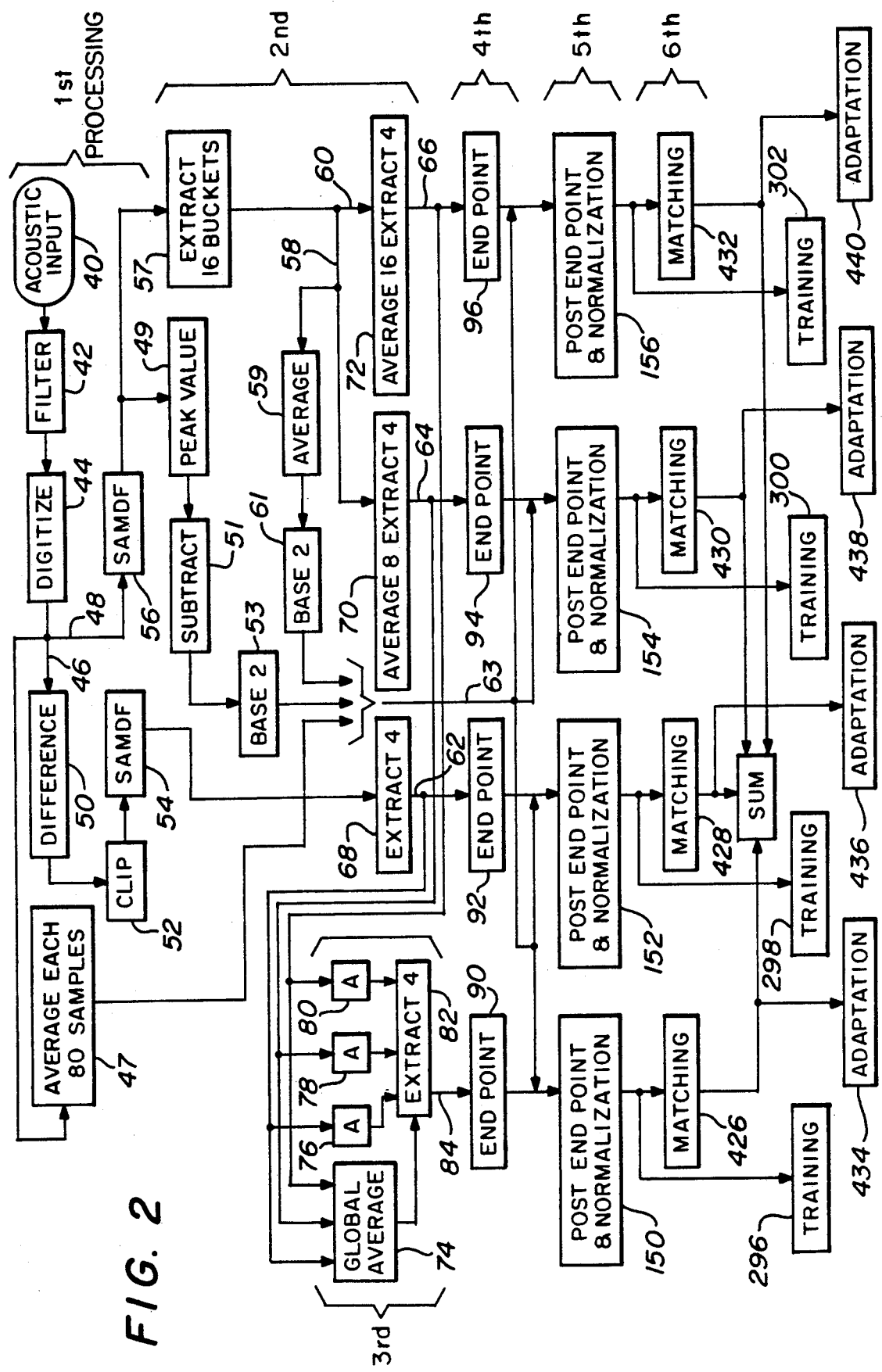
FIG. 2 is a flow chart of the steps used in the present invention to extract the information-bearing portion of a signal for recognizing varying instances of similar patterns.

The initial processing of the signal is illustrated in the flow chart of FIG. 2. The analog speech input signal on line 40 is first filtered at Step 42 by a band pass filter with cut-off frequencies at 300 and 3200 Hz. The signal is then digitized at Step 44 by an analog-to-digital converter at a sampling rate of 8000 times per second and split into two channels 46 and 48. Channel 46 is differenced at Step 50 to provide a high pass version of the signal (the differencing function serves to high pass filter the signal at 6 db per octave). The signal on high pass channel 46 is then infinitely peak-clipped at Step 52 by converting each positive sample to a "one" and each negative sample to a "0".

Each of the two digital streams 46 and 48 is then "correlated" at Steps 54 and 56 using the proprietary signal processing method and apparatus disclosed in commonly assigned U.S. Ser. No. 372,230. The frame or histogram rate for this process is 100 Hz, or one frame every ten msec. Each frame consists of twenty samples, four of which are generated from processing the signal of the high-frequency channel 46 and sixteen from the broadband channel 48.

A three-channel base representation is generated. As described previously, two channels, 46 and 48, are initially generated by the correlation process. The high frequency channel 46 consists of four data measurements derived by correlating the infinitely peak clipped version of the signal, and the low frequency channel 48 consists of 16 measurements derived from correlating the raw digital samples. The 16 measurements of the low frequency channel 48 are then further processed to produce two channels 58 and 60 of four measurements each. The first of these two, channel 64, is derived by averaging adjacent measurements across the first eight measurements and the second, channel 66, is derived by averaging four measurements at a time across all sixteen measurements. The resulting representation thus includes three channels of four measurements each at 62, 64 and 66.

A fourth channel is then derived. As stated previously, a "channel", as used herein, is defined as a set of related measurements that are operated on in a like manner. The fourth channel derived herein consists of average amplitude measurements from each of the three channels 62, 64, and 66 plus a global average taken across all three channels. Thus, global averaging at Step 74 accepts as inputs the outputs of Steps 68, 70 and 72 on lines 62, 64 and 66 respectively. Steps 76, 78 and 80 average the data buckets coupled to them on lines 62, 64 and 66 respectively. The output of the global averaging at Step 74 and the three-channel averaging at Steps 76, 78 and 80 are coupled to Step 82 that generates four measurements or "buckets" representing the combined average amplitudes of the three frequency channels and the global amplitude.

Three measurements of the utterance energy envelope are taken. The first is calculated directly from the digitized waveform at Step 44 by averaging the absolute values of 80 measurements at a time (10 msec.) at Step 47 with the result being fed to the normalization process at Steps 150, 152, 154 and 156 as indicated by line 63.

Both the second and third measurements are derived from the histograms generated by the correlation process. The second is derived by extracting at Step 49 the peak value from the histogram generated at Step 56 and subtracting at Step 51 the value of the first "bucket" or measurement found in the histogram. The third measurement is derived by averaging at Step 59 all sixteen values in the histogram from Step 57 on line 58. Both the second and third measurements are then $base_2$ log encoded at Steps 53 and 61 respectively and the results coupled on line 63 to Steps 150, 152, 154, and 156 in Stage 5 for use in matching.

The fourth stage of the apparatus shown in FIG. 2 comprises the steps of calculating end points for each channel at Steps 90, 92, 94, and 96. Since the preferred embodiment is an isolated word or phrase recognizer, each utterance recognized by the system must be preceded and followed by a short period of silence. The utterance is captured and framed by a process designed to determine the beginning and the ending point of the utterance. This process is usually called an end point algorithm.

The end point algorithm is based on the observation that syllables, the building blocks of words, are structured with a voiced nucleus which may be preceded by an unvoiced onset and/or followed by an unvoiced offset. The algorithm captures the voiced syllable nuclei and retains some of the signal surrounding the nuclei in order to capture unvoiced onsets and offsets.

END POINT ALGORITHM

The end point algorithm can accept any appropriate signal, such as an input energy envelope. In one embodiment, the algorithm uses a signal termed the "correlation envelope" which is a measure that takes into account both the energy and degree of autocorrelation of the input. The correlation envelope is derived from the raw channel SAMDF representation by subtracting the value in the first bucket from the peak value in the first sixteen measurements. This will cause a large value for voiced speech and a small value for unvoiced speech (and for silence), since voiced speech generally has a smaller value in the first bucket of the SAMDF function, and a higher peak value over the first sixteen measurements. In fact, for unvoiced speech, the first measurement often holds the peak value, thus making the correlation envelope equal to zero.

Figure 3A:
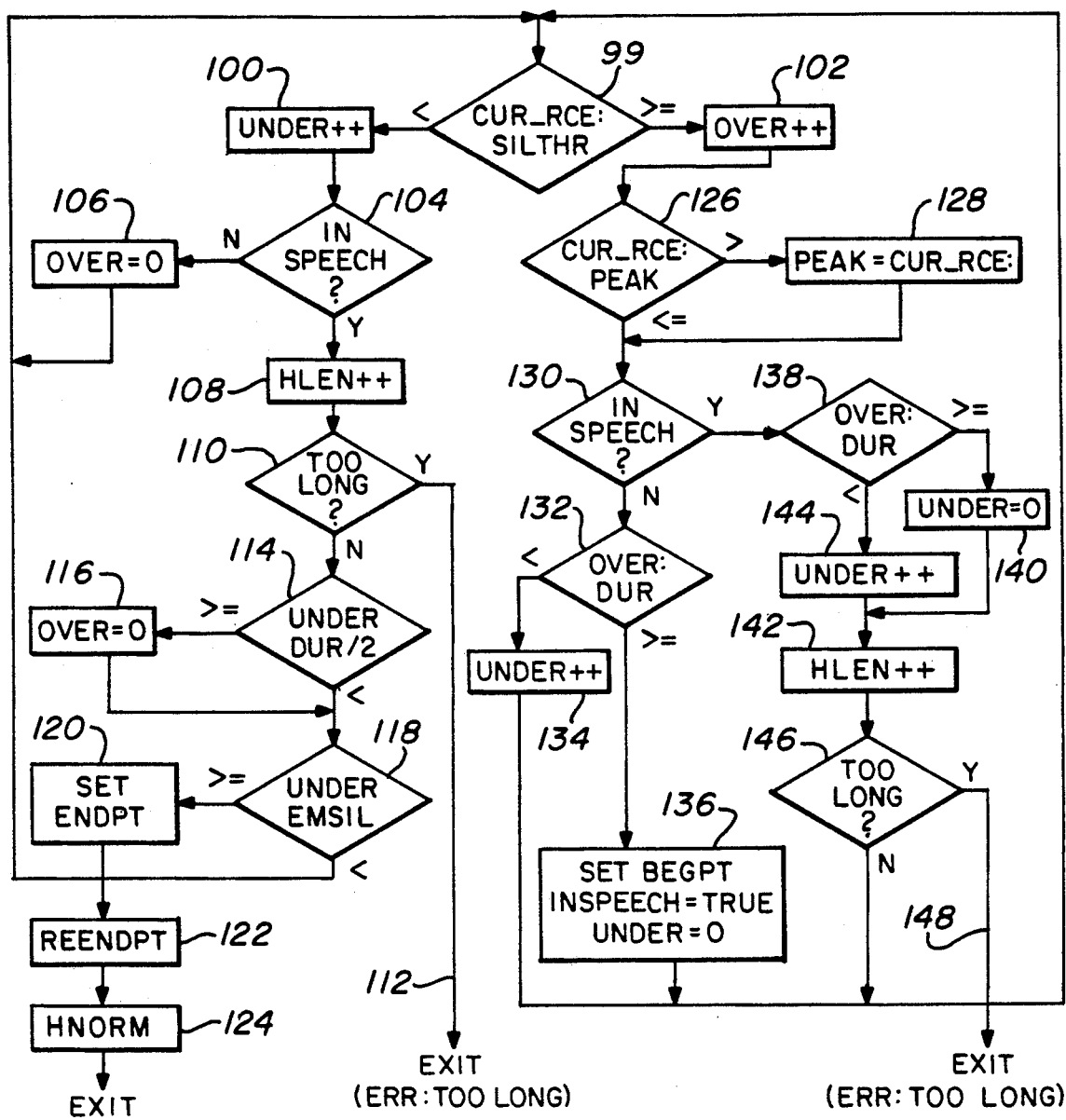
FIG. 3A is a flow chart of the algorithm used to determine the beginning and ending point of an utterance or information-bearing portion of a histogram as shown in FIG. 3B.

FIG. 3A is a flow diagram of the end point process. A number of variables and parameters are used in the diagram and are defined as follows:

cur_rce: correlation envelope value of the current signal frame;

silthr: silence threshold;

over: number of consecutive frames or histograms with a correlation envelope above the silence threshold, initially zero;

under: number of consecutive frames or histograms with a correlation envelope below the silence threshold or otherwise considered unvoiced, initially zero;

hlen: length of current utterance in frames or histograms, initially zero;

dur: number of consecutive frames or histograms which must be above silence threshold in order for signal to be considered speech;

emsil: maximum number of consecutive frames or histograms below the silence threshold which may be embedded within an utterance;

peak: peak correlation envelope value for current utterance, initially zero;

inspeech: boolean, true if an utterance begin point, but no end point, has been detected, initially false;

begpt, endpt: utterance begin point and end point; commonly referred to in the literature as utterance end points.

At Step 99, the algorithm compares the correlation envelope of the input signal frame or histogram to the silence threshold. If the correlation envelope is less than the silence threshold, the algorithm branches to Step 100; otherwise, it branches to Step 102. At Step 100, the variable "under" is incremented. Step 104 checks the boolean variable "inspeech" to determine whether or not the current signal frame is considered to be a continuance of an utterance. If it is, then the frame is "in speech". If the current signal is not speech, then the variable "over" is reset to zero at Step 106 and control continues back to Step 99 to process the next input frame. If the current frame is considered to be speech, Step 108 increments the variable "hlen" after which Step 110 checks to see if the utterance has exceeded the allowable utterance length.

If the utterance is too long, then the routine exits with an error condition as indicated by Line 112. Otherwise, it continues to Step 114 which tests the length of the time the utterance has been below the silence threshold against half the value of the parameter "dur". If the utterance has been below the silence threshold for dur/2 or more frames, then "over" is reset to zero at Step 116. The purpose of this is to enable the system to ignore a short excursion above the silence threshold at the end of an utterance. The algorithm continues at Step 118 to check "under" against "emsil", the maximum number of consecutive unvoiced frames allowed to be embedded within an utterance. If the count is less than "emsil" control returns to Step 99 to process the next input frame; otherwise, the utterance is considered ended. Step 120 sets the utterance ending point (endpt) at the fifteenth frame (150 ms) following the voicing offset. The process exits to Step 122, an optional second pass end point (or reendpoint) algorithm, after which the framed utterance is further processed by normalization procedures at Step 124, discussed hereafter.

The preceding discussion described the algorithm's action on a frame for which the correlation envelope is below the silence threshold. If the test at Step 99 determines that the correlation envelope is above the silence threshold, then control branches to Step 102, where "over", the count of consecutive frames above the silence threshold, is incremented. Step 126 checks to see if the correlation envelope for the input frame exceeds the peak correlation envelope for this utterance; if it does, then Step 128 records the new peak value. The peak value is used in the optional second pass end point algorithm (Step 122, as stated previously).

Step 130, like Step 104, checks to see whether or not the signal is considered to be "in speech." If not, Step 132 compares "over" against "dur," the minimum duration of voicing allowable for an utterance. If "over" is less than "dur," Step 134 increments "under" since the frame is, at this time, still considered unvoiced. Control then returns to Step 99 to process the next input frame. If the minimum duration of voicing has been reached or exceeded, Step 136 sets the utterance begin point "begpt" to the fifteenth frame (150 ms) before the onset of voicing, sets the boolean variable inspeech to true, and resets "under" to zero.

If, at Step 130, the utterance is already in speech, Step 138 compares "over" against "dur." If "over" exceeds "dur", then "under" is reset to zero at Step 140 whereupon control passes to Step 142. If "over" is less than "dur" at Step 138, then Step 144 increments "under." Step 142 increments "hlen" after which Step 146 checks to see if the utterance has exceeded the maximum allowable length. If so, the process exits with an error condition as indicated by line 148; if not, control returns to Step 99 to process the next input frame.

Figure 3B:
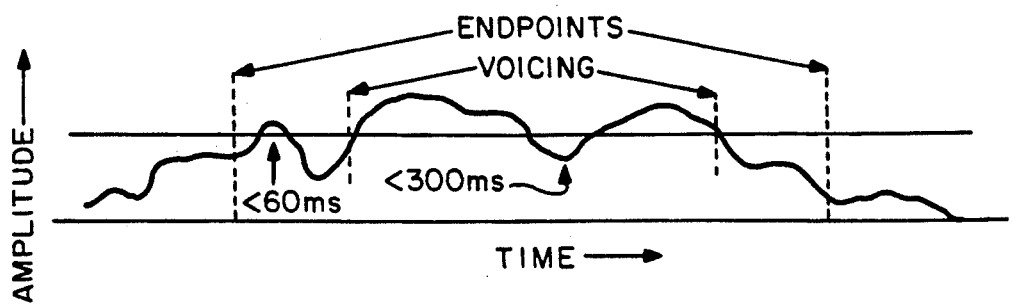

The process is illustrated in FIG. 3B which shows where the algorithm would set voicing onset and offset as well as end points on a sample utterance. For the purpose of the examples shown in FIG. 3B, "dur" is set to six, meaning an utterance must have at least six consecutive histograms or frames (sixty ms) above the silence threshold and "emsil" is set to thirty, meaning an utterance may contain up to twenty-nine consecutive embedded unvoiced frames (290 ms).

A novel feature of the end point algorithm is the use of an adaptive silence threshold on an optional second pass over the captured utterance (Step 122). The adaptive silence threshold is calculated by finding the maximum value of the correlation envelope over the captured utterance (Steps 126 and 128 in FIG. 3A) and dividing that number by a predetermined factor. Optionally, there may be a ceiling and/or a floor placed on the second pass silence threshold in order to keep the threshold from being too high, thus losing part of the input utterance, or too low, thus accepting too much of the signal surrounding the input utterance. When the background noise level is high, thus causing a low signal-to-noise ratio for the input speech, it has been found useful to set the first pass silence threshold to a high value and to set the ceiling of the second pass silence threshold equal to the value of the first pass threshold, thus ensuring that the second pass will never shorten the utterance, but perhaps lengthen it. This has the effect of using the first pass as a filter, triggering only when there is high confidence of speech input, while the second pass adjusts the end points to capture the entire utterance. Except for the use of the adaptive second pass silence threshold, the second pass end point algorithm is the same as the first.

After calculating the end points in the fourth stage as set forth previously, the signals in each channel are coupled to the fifth stage in FIG. 2 where circuits 150, 152, 154 and 156 perform post-end point processing and normalization. Both time and amplitude normalization is performed by the circuits.

TIME NORMALIZATION

Figure 4A:
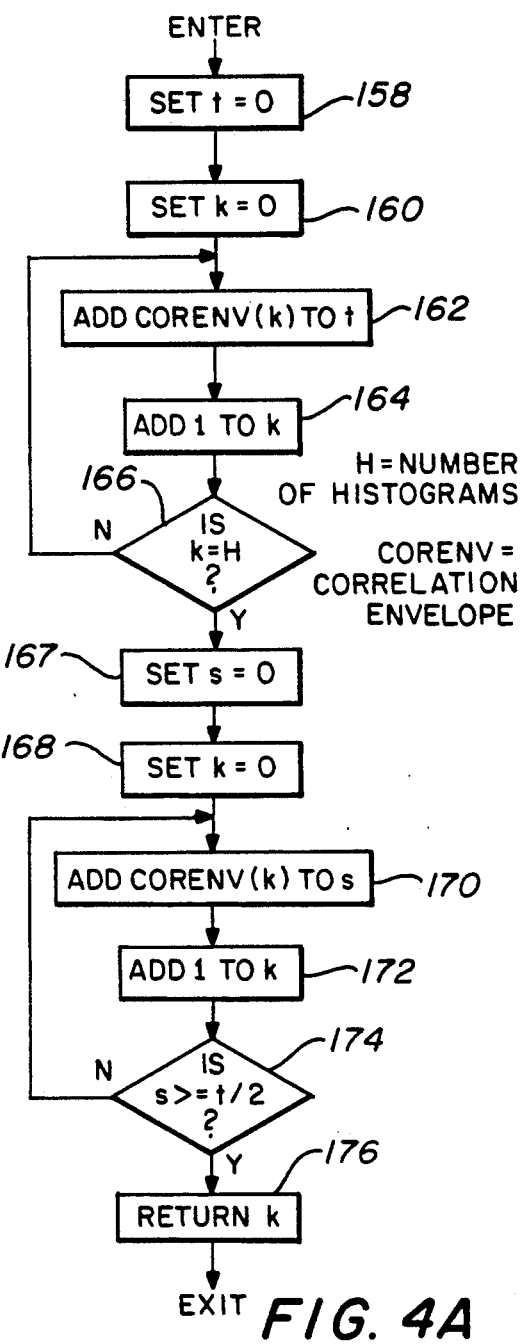
FIG. 4A is a flow chart of the method used to set the utterance mid-point for performing time normalization.
Figure 4B:
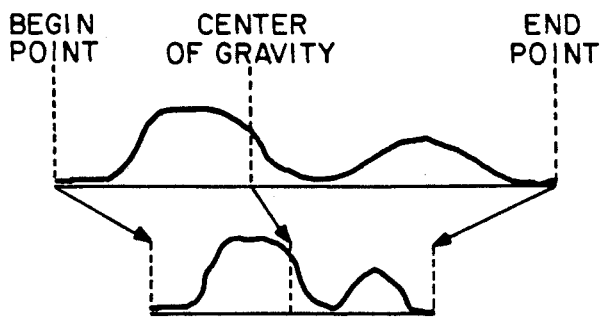
FIG. 4B illustrates the utterance midpoint in a graphic representation.

The time normalization algorithm is a an improvement on conventional linear time normalization methods. Conventional methods rely solely upon the detection of the beginnings and endings of words as reference points for time normalization. In the novel method used herein, a center reference point is also determined prior to normalization. This point is derived by calculating a center of gravity for the utterance based on a correlation envelope associated with each frame. The method for calculating the center of gravity is illustrated in FIG. 4A and the graphical illustration is shown in FIG. 4B. The calculation is performed in two passes. The first pass sums the correlation envelope across the utterance. Thus, in FIG. 4A, at Step 158, the sum, t, is set to zero and at Step 160 the number of frames, k, is set to zero. At Step 162, the correlation envelope value for frame k is added to t. At Step 164 the frame k is incremented by one. At Step 166, a check is made to see if the number of frames processed equals the number of histograms in the utterance. If not, control is returned to Step 162 where the correlation envelope for the kth frame is added to t. The process is repeated until the number of frames k that are processed equals the number of histograms in the utterance. Thus, each frame in the correlation envelope is summed across the utterance. The second pass sums the correlation envelope, frame by frame, until one-half of the total derived from the first pass is equaled or exceeded. Thus, at Step 167, the sum, s, is set to zero, and at Step 168, the frame counter k is set to zero. At Step 170 the correlation envelope for frame k is added to the sum s of the frames processed. At Step 172, k is incremented by one. At Step 174, it is determined if the sum of the frames processed is equal to or exceeds one-half of the total derived from the first pass. If not, control returns to step 170 where the next correlation envelope value is added to the sum, s. The process is repeated until the sum of the frames is equal to or exceeds one-half of the total derived from the first pass. Step 176 then returns the utterance midpoint that was calculated. Normalizing the variable number of ten ms histograms to the fixed number of histograms per word is then performed in two linear interpolation operations: (1) from the beginning point shown in FIG. 4B through the center of gravity, and (2) from the center of gravity to the end point. This method has been found to increase the accuracy of the recognition circuitry by biasing the alignment toward the accented portion of the utterance.

AMPLITUDE NORMALIZATION

Amplitude normalization is performed in stage five at steps 150, 152, 154 and 156 shown in FIG. 2.

There are three separate amplitude normalization algorithms or routines. All three algorithms locate a maximum and minimum value across a set of measurements or buckets and scale each bucket in the set to a value from zero to fifteen relative to the maximum and minimum values. The first twelve buckets in each histogram (in the first three channels) are scaled and rescaled by all three algorithms A, B and C. The four buckets in the fourth channel are first scaled by algorithm A and then rescaled by algorithm B. The remaining three buckets (at 63 in FIG. 2) are scaled only by algorithm B. The three amplitude normalization algorithms differ only in the dimension across which the maximum and minimum values are located. Thus, each bucket in the representation is normalized relative to other buckets within the same set and then the dimension across which a "set of buckets" is defined is changed and the bucket is rescaled.

NORMALIZATION WITHIN EACH HISTOGRAM AND WITHIN EACH CHANNEL

The first algorithm, algorithm A, performs amplitude normalization within each histogram and within each of the four channels. This normalization procedure operates on each ten ms histogram and within each of the four channels shown in FIG. 2. The data for each channel consist of a set of four buckets on lines 62, 64, 66, and 84 in FIG. 2. Thus, for each histogram and for each channel, the maximum and minimum values are located within the set of four buckets, the maximum is set to 15, the minimum is set to zero, and the other two buckets are scaled accordingly. This process is illustrated in FIG. 5.

Figure 5:
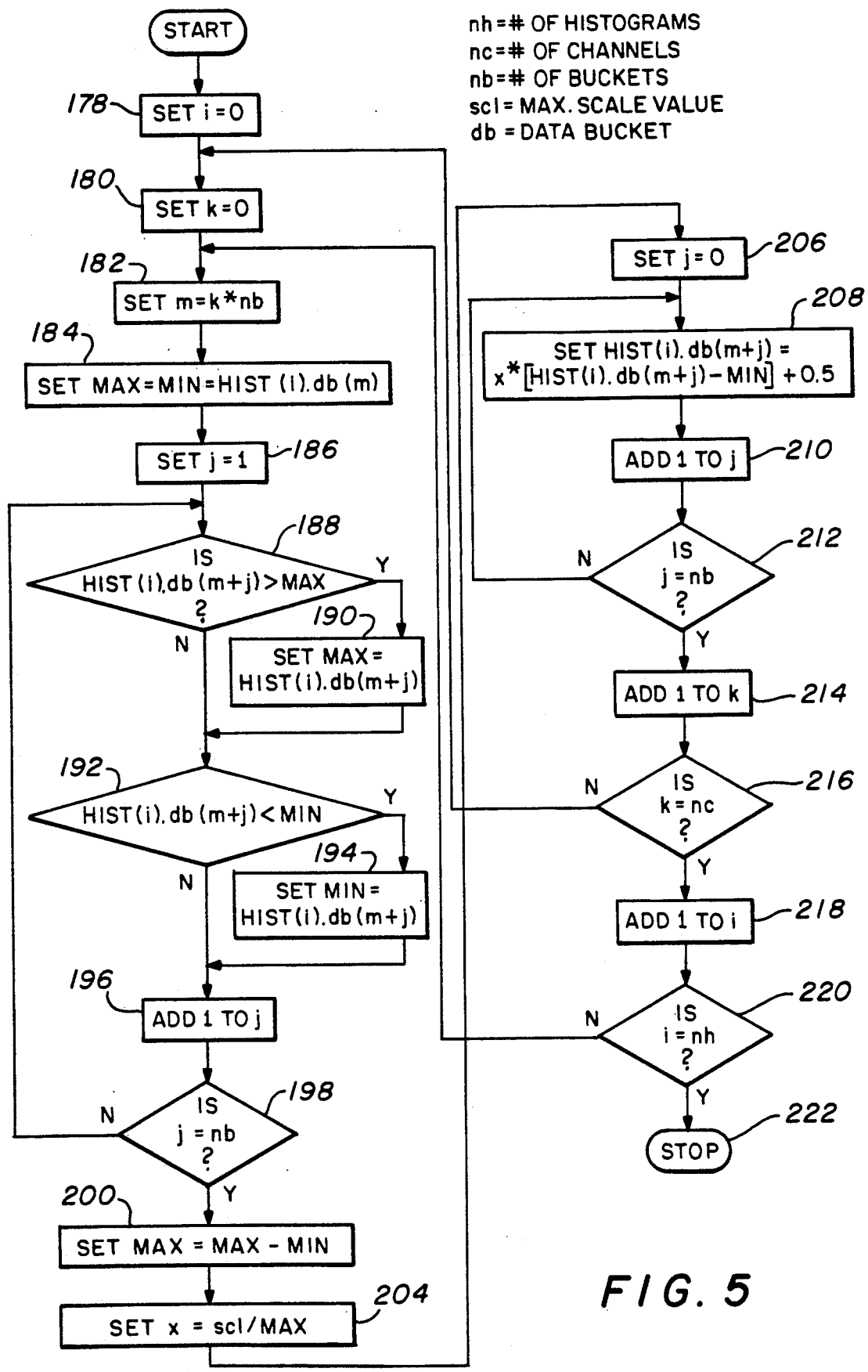
FIG. 5 is a flow chart illustrating the steps necessary during amplitude normalization for normalizing data within each histogram and within each channel.

On entry to FIG. 5, each histogram consists of 4 data buckets from each of the 4 channels plus 3 additional amplitude measurements (19 buckets total). Channel #1 includes buckets 1–4, channel number 2 includes buckets 5–8, channel number 3 includes buckets 9–12, and channel number 4 includes buckets 13–16. The other three buckets 17–19 are the three energy measurements shown in FIG. 2 on line 63 that are coupled to the post end point and normalization steps 150–156 in the fifth stage. In FIG. 5, i identifies the current histogram being processed, k identifies the current channel, m is the starting bucket within the histogram of the current channel, and j is the current bucket within the channel. Steps 184–198 find the maximum and minimum values within the current channel. Histogram buckets 17–19 are not affected by the process in FIG. 5.

After starting the procedure, Step 178 sets the histogram number, i, to zero and Step 180 sets the channel number, k, to zero. At Step 182, m is set to the first bucket of channel k. At step 184, the maximum and minimums are initialized to the value in the first data bucket of channel k. At Step 186 the bucket number is set to one and at Step 188 it is determined if the value in data bucket m plus j is greater than the current maximum. If yes, Step 190 sets the maximum for that channel to the value in data bucket m+j and proceeds to Step 192. Step 192 then determines if the value in data bucket m+j is less than the current minimum. If yes, the minimum is set at Step 194 to the value in data bucket m+j. At Step 196, the number of buckets is incremented by one and at Step 198 it is determined if all the buckets in channel k have been processed. If not, control is returned to Step 188 where it is determined if the next bucket value exceeds the maximum. The process is repeated until Step 198 finds that all of the buckets in channel k have been examined or processed. Then at Step 200, the maximum is set equal to the maximum minus the minimum, and at Step 204 a scale factor x is set which equals the maximum scale value divided by the maximum value; these steps ensure that each channel will contain a value of zero, 0, as well as a value of scl. At Step 206, the bucket number is set to zero and at Step 208 the m+j data bucket for the ith histogram is set to the product of x and the value of the data bucket m+j for the ith histogram minus the minimum of channel k. This value is rounded by adding 0.5 before integer truncation by machine arithmetic. At Step 210, the data bucket number is incremented and at Step 212 it is determined whether the number of data buckets processed is equal to the number of buckets nb in the channel. If not, control returns to Step 208.

If so, at Step 214, the channel number is incremented by one and at Step 216 it is determined whether all of the channels have been processed. If not, control returns to Step 182 and the process is repeated for the next channel. If yes, Step 218 increments i and Step 220 determines whether all histograms have been processed. If not, control returns to Step 180 to process the next histogram. The algorithm ends at Step 222.

NORMALIZATION ACROSS HISTOGRAMS

Algorithm B provides normalization of each bucket across histograms. This second amplitude normalization procedure occurs following time normalization. This process normalizes each of the 19 buckets per histogram independently of all other buckets within the histogram by referencing the bucket across histograms.

Thus bucket zero in each histogram is scanned across all 24 histograms and the maximum and minimum values are located. These bucket zero values are set to 15 and to zero respectively and all other bucket zero values are scaled (or re-scaled) accordingly. This process is then repeated for bucket one and so on. This algorithm is illustrated in FIG. 6.

Figure 6:
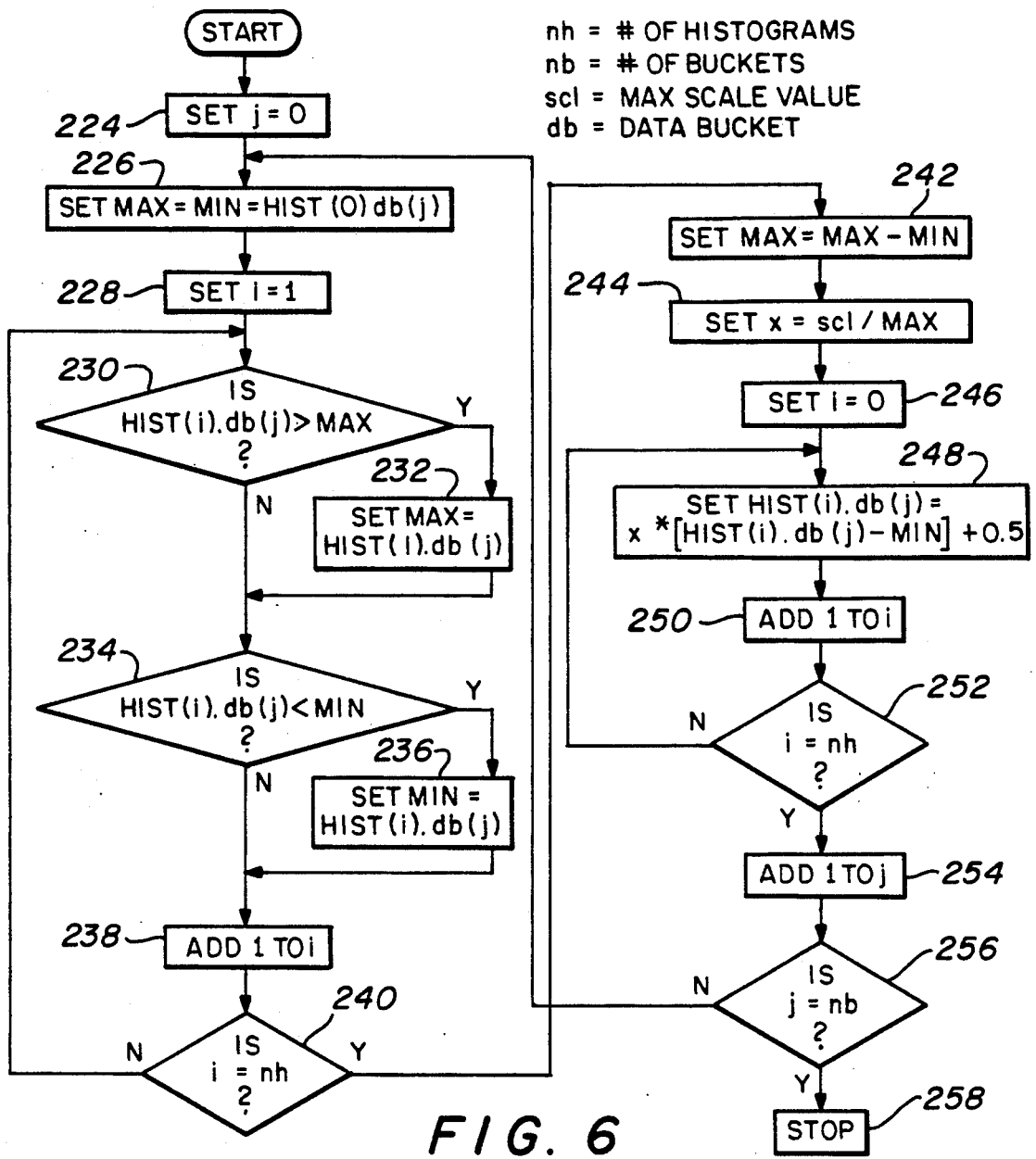
FIG. 6 is a flow chart of the steps necessary during amplitude normalization for normalizing each bucket across histograms.

At Step 224 in FIG. 6, the bucket number is set to zero. At Step 226 a maximum and minimum value is set to bucket j of histogram zero. At Step 228, the histogram number is set to one. Step 230 determines if the value in bucket j of histogram i is greater than the maximum. If so, Step 232 stores the maximum for that bucket and histogram. Then Step 234 determines whether or not bucket j of histogram i is less than the minimum. If yes, the minimum is set at Step 236 for bucket j of histogram i. At Step 238, the histogram number is incremented by one and at Step 240 it is determined whether all of the histograms have been processed. If not, control returns to Step 230 and the process is repeated until Step 240 outputs a yes. Then, at Step 242, the maximum is reset to equal the difference between the maximum and the minimum. A scaling factor x is determined at Step 244 to equal the maximum scale value divided by the maximum. At Step 246 the histogram number is set to zero and at Step 248 the value of the jth data bucket for the ith histogram is set to a value x times the quantity (value of the data bucket j of histogram i minus the minimum) plus 0.5. At Step 250 the histogram number is incremented by 1 and Step 252 determines whether all of the histograms have been processed. If not, the process returns to Step 248 and is repeated until decision circuit 252 outputs a yes. Step 254 increments the bucket number by one and Step 256 determines whether all of the buckets have been processed and normalized. If not, control returns to Step 226 and the process is repeated until Step 256 outputs a yes and the algorithm concludes at Step 258.

NORMALIZATION WITHIN HISTOGRAMS

Figure 7A:
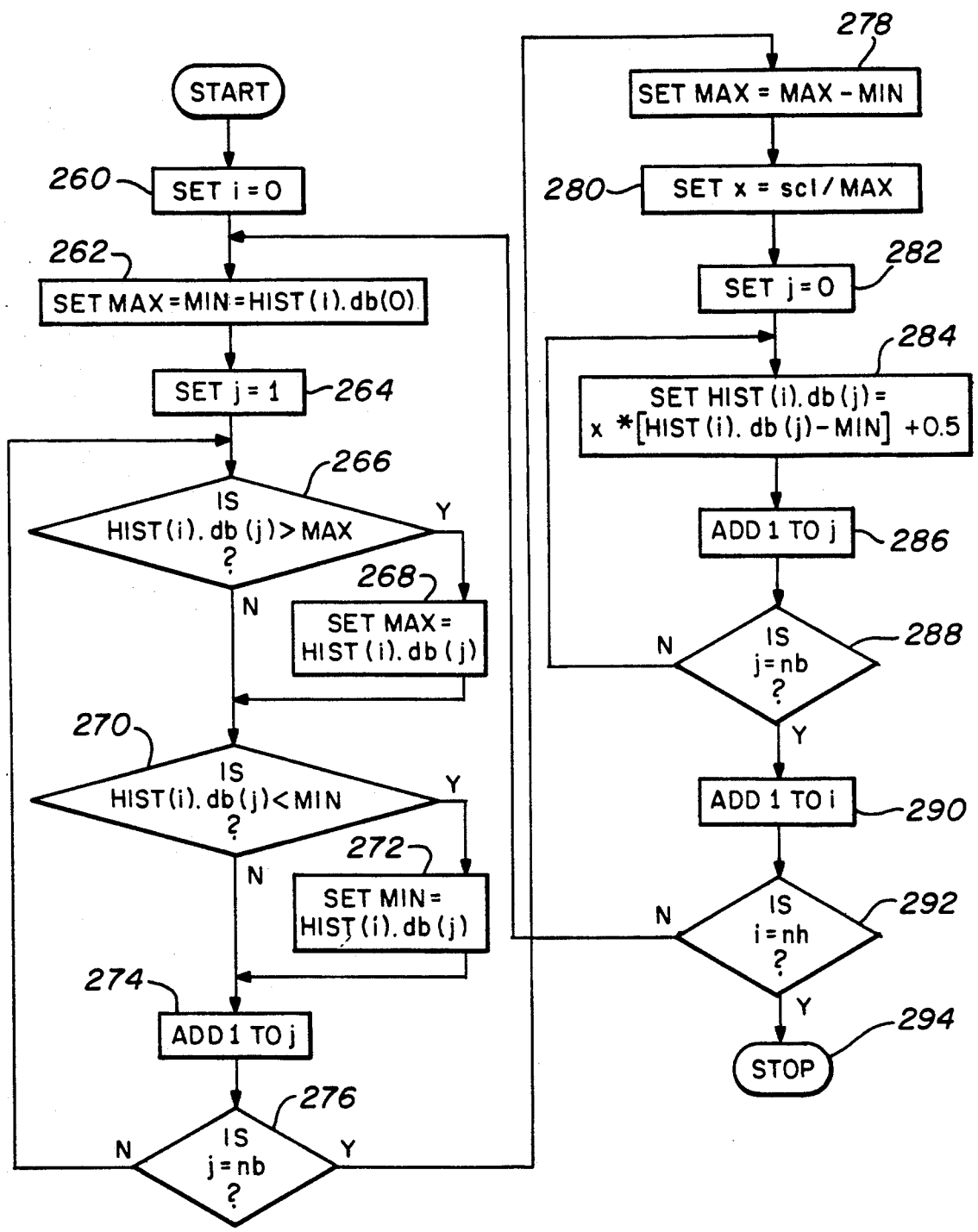
FIG. 7A is a flow chart of the steps necessary during amplitude normalization for normalizing each histogram across buckets.

Algorithm C provides normalization across buckets within each histogram. This amplitude normalization algorithm again operates on a histogram-by-histogram basis but this time across all of the first twelve buckets (lines 62, 64, and 66 in FIG. 2). Again, the maximum and minimum scoring values are located and set to 15 and zero respectively and then all others are scaled accordingly. This algorithm is illustrated in the flow chart of FIG. 7A. After the algorithm starts at Step 260 in FIG. 7A, the number of the histogram being processed is set to zero. At Step 262, the maximum and minimum scoring value is set to the value in data bucket zero of histogram i. At Step 264 the bucket number is set to 1. At Step 266, it is determined whether the value in the data bucket being processed for the particular histogram is greater than the current maximum. If yes, that value is stored at Step 268. Step 270 then determines whether the value in data bucket j for histogram i is less than the minimum. If yes, that value is stored at 272. Step 274 then increments the bucket number by one. Step 276 determines whether all of the buckets have been processed. If not, control returns to Step 266 where the process repeats itself. When all of the buckets have been processed as determined at Step 276, Step 278 sets the maximum value to an amount equal to the maximum minus the minimum value. At Step 280, a value x is set to equal the maximum scale value divided by the maximum value. At Step 282, the bucket number is set to zero and at Step 284 a value is set for the data bucket j of histogram i as the value x times the quantity (value of data bucket j of histogram i minus the minimum)+0.5. At Step 286 the bucket number is incremented by one and Step 288 determines whether all of the buckets have been processed. If not, control returns to Step 284 and the process repeats itself until Step 288 outputs a yes to Step 290 where the histogram number is incremented by one. At Step 292 it is determined whether all of the histograms have been processed. If not, control is returned to Step 262 and the process repeats itself until step 292 indicates that all of the histograms have been processed. At that point, the algorithm stops at Step 294.

The final stage of the post-end point processing in Stage 5 of FIG. 2 utilizes redundant features that involve locating the onset and offset of the utterance based on the normalized representation and copying histograms immediately surrounding the onset and offset to another location in the representation. This process enhances performance of the word recognizer in two ways. First, the redundancy serves to weight more heavily the perceptually important transitional region that exists between consonantal cues such as burst frequencies, frication, nasal murmurs and the like and the vowel nucleus of the syllable. Secondly, copying these regions to another location within the representation serves to enhance the alignment of these cues during training and matching.

Figure 7B:
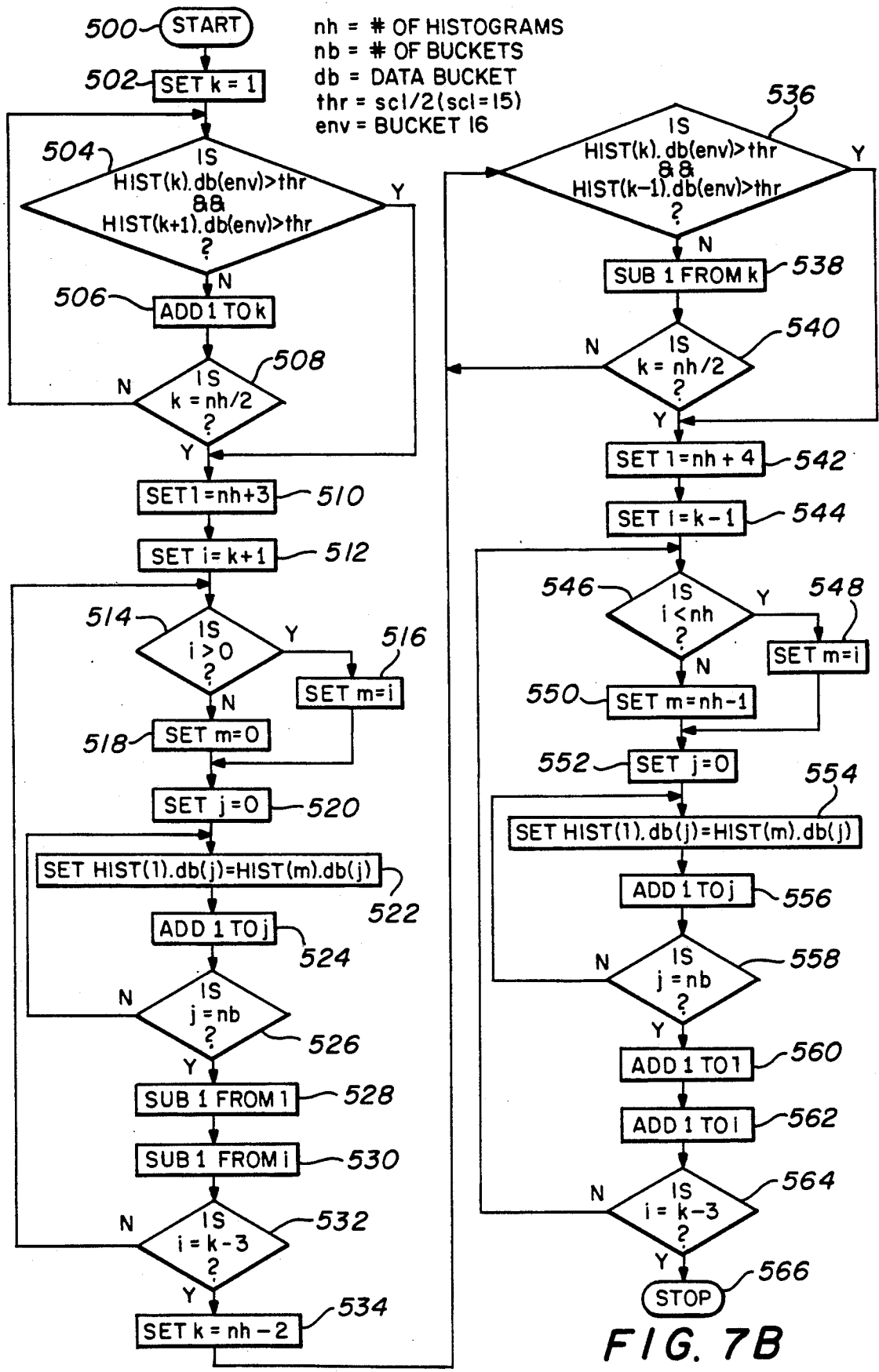
FIG. 7B is a flow chart illustrating the steps for generating redundant features to enhance performance of the recognizer.

FIG. 7B is a flow chart illustrating the Steps for generating redundant features to enhance performance of the recognizer as set forth above. Steps 500 through 532 locate the onset of the utterance and copy histograms immediately surrounding the onset to a first selected location in the normalized representation while Steps 534 through 566 in FIG. 7B locate the offset of the utterance based on the normalized representation and copy the histograms immediately surrounding the offset to a second selected location in the normalized representation.

The isolated word recognizer described herein is a template based system, meaning that the system matches input or "unknown" utterances against a set of prototypes, or templates, representing the utterances accepted by the system (the "vocabulary"). In the preferred embodiment, one composite template is formed for each utterance in the vocabulary. A composite template is formed by merging a number of examples of the specified utterance, spoken by a number of speakers. This composite template may then be "adapted" by a process described hereafter. A novel aspect of the system is the maintenance of two forms of the composite template of each utterance: the "summed" template enables the system to add training to any template; the "averaged template", generated from the summed template, is the form matched against the unknown utterance. A composite template consists of 32 histograms, each containing 19 data buckets (or data points) and 19 variance buckets (or variance points); each variance bucket holds information related to a corresponding data bucket (variance bucket number zero corresponding to data bucket number zero, and so forth).

TRAINING

FIGS. 8A and 8B illustrate the process of creating or updating a summed template for a given utterance. This process is repeated for each vocabulary word or phrase. The process illustrated in FIG. 8A assumes a file, holding some number of example utterance templates, for each vocabulary entry. In FIG. 8A, at Step 304, the current summed template for the given utterance is retrieved by the system. If the utterance has not been trained previously, then this template has a value of zero in all data and variance buckets and the train count (designated "count" at step 310 in FIG. 8A) is zero. Step 306 reads a training template from the file of example utterances. Step 308 checks to see if all training templates have been processed. If so, the routine exits and stops. Otherwise, the process continues to Step 310 where the train count is incremented.

If the train count is allowed to grow indefinitely, then continuing training will have less and less effect on the composite template. In order to keep the effect of training from diminishing below a certain level, an arbitrary ceiling is placed on the train count. Step 312 checks to see if this ceiling has been exceeded, and, if it has, branches to Step 330 in FIG. 8B in order to reduce the count. The count is reduced in FIG. 8B by subtracting the average of the value of each data bucket and by subtracting the square of the average from the value of each variance bucket. To this end, Step 330 in FIG. 8B decrements the count, thus making it equal to the train count ceiling. Step 332 initializes a counter to control the outer (histogram) processing loop while Step 334 initializes a counter to control the inner (bucket) processing loop. At Step 336, the average is calculated for the given data bucket. At Step 338, the bucket average is subtracted from the data bucket, and at Step 340, the square of the data bucket average is subtracted from the variance bucket. Step 342 increments the bucket counter. If there are buckets remaining to be processed at Step 344, control branches back to Step 336. If, at Step 344, all buckets have been processed, then Step 346 increments the histogram counter and Step 348 checks to see if all histograms have been processed. If not, control branches back to Step 334. When all histograms have been processed, Step 348 causes control to return to Step 316 in FIG. 8A.

Steps 314, 316, 318, 320, 322, 324, 326, and 328 in FIG. 8A comprise nested control loops similar to those in FIG. 8B. In FIG. 8A, however, the process is adding the training template to the summed template. Steps 314 and 316 initialized the inner and outer loop counters for the histograms and buckets respectively. Step 318 adds the template bucket data value to the summed template data value and Step 320 adds the square of the template data value to the summed template variance bucket. Steps 322 and 324 implement the inner loop structure by incrementing the bucket counter at Step 322 and branching at Step 324 back to Step 318 if there are more buckets to process. If all buckets have been processed, Step 326 increments the histogram counter and Step 328 checks for completion of histogram processing. If histograms remain to be processed, Step 328 branches back to Step 316. Otherwise, control returns to Step 306 to process the next training template.

When the process exits from Step 308, the summed template consists of an array of data buckets, each holding the sum (less the effect of count reduction) of all corresponding buckets in the training templates and an array of variance buckets, each holding the sum (less the effect of count reduction) of the squares of all corresponding buckets in the training templates. The purpose of maintaining the sums of the squares of bucket values is to enable the system to calculate the standard deviations of buckets values when calculating the averaged templates.

FIGS. 9A and 9B illustrate the process of calculating an averaged template from a summed template. After the process is started at Step 350, Step 352 retrieves the current averaged template. Step 354 initializes a variable which will accumulate the sum of all the variance buckets for use in variance normalization, described below. Loop counters are initialized at Steps 356 and 358 to count histograms and buckets, respectively. Step 360 sets the averaged template data bucket to the value of the summed template data bucket divided by the train count. Step 362 sets the averaged template variance bucket to the standard deviation of the value of the summed template data bucket (note that, because of the effects of train count reduction, this may not be a true standard deviation, but only an approximation thereof). These values are referred to as "variances" because they determine the distances within which a test (or "unknown") template is allowed to vary without penalty from the data buckets.

Step 364 adds the standard deviation, calculated in Step 362, to the variable totalvar. Steps 366 through 372 provide control for inner and outer processing loops on the buckets and histograms.

Step 374 normalizes the averaged template variance buckets according to a scale factor which may have a different value for different vocabularies and for different input conditions (local or long distance telephone, different types of microphone, and so forth). The variance normalization process is expanded in FIG. 9B. The process in FIG. 9B is entered at Step 378 where the normalization factor is determined by dividing the maximum possible total variance by the actual total held in the variable totalvar and multiplied by the scale factor. Steps 380, 382, 386, 388, 390 and 392 implement outer and inner loop control for the data buckets and histograms. The normalization activity takes place at Step 384 wherein the averaged template variance bucket value is multiplied by the normalization factor. The process exits from Step 392 to the stop Step 376 in FIG. 9A when the test in Step 392 is satisfied.

Variance normalization creates a vocabulary in which each template has equal variance although the variance for each word will be distributed differently across the template.

The averaged templates make up the "vocabulary" kept by the recognition system. These templates are matched by an input unknown or test utterance to effect recognition.

MATCHING FOR RECOGNITION

The system recognizes input speech by matching the input ("test") utterance against the vocabulary templates. The template yielding the lowest scoring value is returned by the system as being the recognized utterance, although, as is well-known in the art, the recognition choice may be "rejected" if the scoring value is too high or if the second best match scoring value is too close to the best score.

FIG. 10 illustrates the process of matching a test template against the vocabulary. After the process is started, Step 394 initializes a counter, i, to index the vocabulary templates. At Step 396, the score of the current word is initialized to zero while steps 398 and 400 initialize counters j and k to index histograms and buckets, respectively.

Steps 402 through 408 calculate the score for a single bucket and add it to the cumulative score. The first step, Step 402, calculates the well-known "city block" or L1 distance between the test template and the current vocabulary template. This distance is normalized at Step 404 by subtracting the value of the associated variance bucket. Step 406 ensures that the contribution of the individual bucket can never be negative by adding the bucket score to the cumulative score at Step 408 only if the bucket score is greater than zero as determined by Step 406.

Step 410 increments the bucket counter and Step 412 checks to see whether the score for all of the buckets in the histogram have been calculated. If not, control branches back to Step 402. If all histogram buckets have been processed, control falls through to Step 414 which increments the histogram counter. If there are more histograms to process, Step 416 causes control to return to Step 400. Otherwise, the score has been completed for the current word. Step 418 increments the template index. Step 420 checks to see if the entire vocabulary has been matched. If not, control returns to Step 396 to continue with the next word. When all words have been matched, Step 422 sorts a list of vocabulary utterances by their scoring values in ascending order (lowest scoring utterance first). This may be effected by any sorting algorithm of the many that are described in the literature. The above described matching process takes place in FIG. 2 by Steps 426, 428, 430 and 432.

ADAPTATION

When operating in the "adapt" mode, the Steps 434, 436, 438, and 440 in FIG. 2 adjust the vocabulary templates to the speaker. Adaptation is controlled using feedback as to the recognition accuracy. A novel feature of the adaptation process is the subtraction of the test template from intruding vocabulary templates as illustrated in FIG. 11.

A vocabulary template is said to intrude on the recognition if its match score, against the unknown template, is too close to (or less than) the match score of the "correct" template, thus causing a rejection or a misrecognition. As an example, consider the following case: the word "one" was uttered (the test template); the score for the vocabulary template corresponding to "one" was 125; the score for the vocabulary template corresponding to "nine" was 111; in this case, if the recognizer is set to reject when the difference between the best match score and the second best is less than 15, then the utterance will be rejected. Otherwise, the recognizer will misrecognize the utterance as "nine". Either way, the template corresponding to "nine" is said to have intruded on the recognition. Template subtraction has the effect of diminishing the "sphere of influence" of intruding templates.

In FIG. 11, Steps 442 and 444 initialize counters used to index histograms and buckets respectively. Step 446 calculates the averaged value of the summed template data bucket. This value is added back to the data and variance buckets later (Steps 452 and 454) in order to keeP the subtraction from having too much effect. Step 448 subtracts the value of the test template data bucket from that of the summed template, while Step 450 subtracts the square of the test template data bucket from the summed template variance bucket. Step 452 adds the previously calculated average (Step 446) to the summed template data bucket Step 452 adds the square of the average to the summed template variance bucket.

Steps 456 through 462 control the bucket and histogram loops. Following template subtraction, adaptation continues. Step 26 (FIG. 1) updates the correct template by adding a training pass using the test template while Step 28 calculates the new averaged templates for the correct vocabulary utterance and any vocabulary utterances which were modified by template subtraction. These processes were described generally with respect to FIG. 1 previously.

Adaptation for the example cited above where "nine" intruded on the recognition of "one", would consist of the following steps:
1. Subtract the test template from the vocabulary summed template for "nine" (Step 38 in FIG. 1 and Step 448 in FIG. 11);
2. Update the vocabulary summed template for "one" with the test template (Step 26 in FIG. 1 and Step 318 in FIG. 8A);
3. Calculate new averaged templates for "one" and "nine" (Step 28 in FIG. 1 and the process shown in FIGS. 9A and 9B).

As stated earlier in the development of the recognizer described herein, the position is taken that speech normalization is a sensory process rather than a perceptual one. Thus, the recognizer described herein uses linear time normalization that does its normalization during the signal processing task exclusively. However, dynamic time warping (DTW) may be used in common recognition strategies and is a common method for time normalization that determines the best fit between the template and an unknown signal. A recognizer using dynamic time warping does its normalization during both the training and matching tasks because it requires a learned reference. Thus, its time normalization cannot precede training and matching. The DTW method is independent of the specific representation and can therefore utilize the signal representations at the matching circuits 426, 428, 430, and 432 as effectively as any other signals. One of the major limitations of the DTW methods is the computational load it puts on the processor. If one is achieving speaker-independent recognition through the use of several templates for each word in the vocabulary, the inefficiencies of DTW soon become a computational load problem. The efficiency of the present system in generating single templates suitable for speaker-independent recognition is a significant benefit when using DTW as the matching algorithm.

Feature based algorithms are distinguished from template-based recognizers such as DTW in the same way that a description of an object differs from a model of an object. This class of recognizers (feature based) is well-known in the art and is based on conventional statistical pattern matching techniques commonly used in optical character devices. The method has yielded the best speaker-independent recognition to date. However, a feature-based recognizer is still dependent on the signal processing algorithms used to extract the features to be measured from the signal. The signal outputs from stage 5, the post end-point and normalization circuits 150, 152, 154, and 156 of the current signal processing technique illustrated in FIG. 2, provide a signal that has already had much of the speaker-variability removed and is, therefore, well suited for feature-detection algorithms.

Vector-quantization algorithms are often used by well-known word recognizers in the art. Vector-quantization is a method for reducing data by matching individual frames to a "standard vocabulary" of frames. This set of frames comprising the vocabulary is called a "code book". A code book, thus, contains a set of acoustic patterns that can be strung together to form phonemes, syllables, and words. Conceptually, a vector-quantization algorithm is one in which the initial recognition of sound is performed at the frame level of analysis, rather than at the syllable or word level.

The present signals available from the fifth stage circuits 150, 152, 154, and 156 in FIG. 2 are particularly well suited to a vector-quantization scheme, due to the compactness of the representation. Since there are only four data buckets per channel, there are only a few possible patterns that can exist for each channel. Since each channel is identical, the same set of patterns in the code book can be used to vector-quantize each channel. In other words, with this representation, vector-quantization is performed on each channel producing three vectors per frame. A second layer of vector-quantization can then be added to further quantize the vector-triads.

Figure 12:
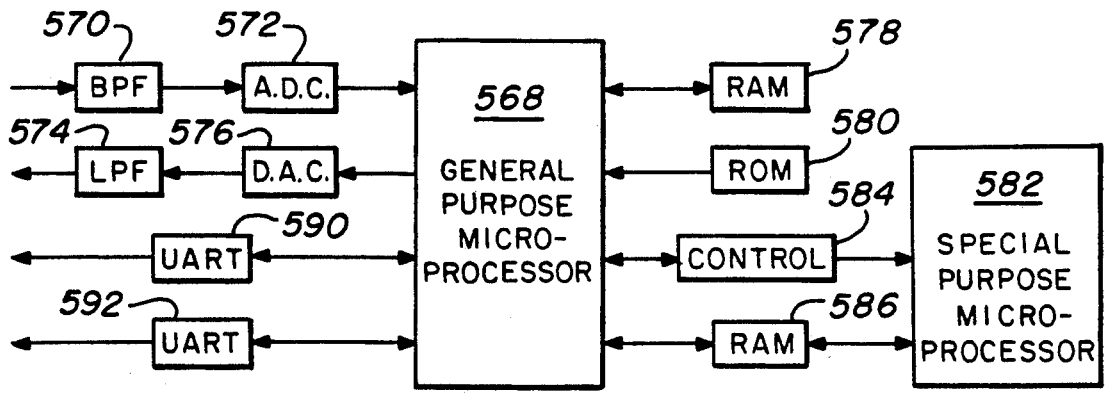
FIG. 12 is a block diagram of a basic microprocessor system that can be used in performing the novel steps of the present invention.

A schematic block diagram is shown in FIG. 12 of a system designed to provide the capabilities needed to produce the signal transformation and processing according to the present invention. For purposes of explanation only, the system will be described in context of a speech development system. It should be noted however that the system in FIG. 12 is fully capable of interfacing with all types of signal processing applications and the reference to speech related applications herein is not meant to be limiting. The system includes a general purpose microprocessor 568 which has several input/output (I/O) devices tied thereto. The system includes a pair of serial digital communication links connected to the general purpose microprocessor 568 through universal asynchronous receiver/transmitters (UART's) 590 and 592. Such devices are well-known in the art and serve to interface the parallel word-based microprocessor 568 to the serial bit communication links. The system also includes an analog input path to the microprocessor 568 that includes bandpass filter 570 and analog-to-digital convertor 572. An analog output path is provided from the microprocessor 568 through digital-to-analog converter 576 and lowpass filter 574. An analog speech waveform is supplied to microprocessor 568 through filter 570 where it is band limited and digitized by converter 572. The digitized version is used as shown in FIG. 2 as the output of digitizer 44.

The general purpose microprocessor 568 has associated with it a random access memory (RAM) 578 for storing application programs and data and also a read only memory (ROM) 580 for storing operating programs which control the microprocessor 568.

The speech system also includes a special purpose microprocessor 582 which, under the control of a software routine, carries out the SAMDF process of FIG. 2. Special purpose microprocessor 582 includes an associated controller 584 for storing this routine and an associated random access memory (RAM) 586 for communicating with general purpose microprocessor 568. All of the algorithms shown in FIGS. 1–11 herein are performed by the two microprocessors 568 and 582 and their associated memories and controls.

While the invention has been described in relation to machine recognition of speech and, in particular, for a system having speech capabilities and speaker-independent recognition capabilities, the system can be used to extract information-bearing portions of any type of signal for recognizing varying instances of similar patterns. Further, while it has use in processing audio signals, it is fully applicable to all types of analog and digital source signals, regardless of how such signals are derived or their frequency.

Accordingly, the present invention provides a method and apparatus for extracting information-bearing portions of a signal for recognizing varying instances of similar patterns. Logarithmic spacing of channels and time and amplitude normalization of each channel enable the detection of variances which become the template that is compared with a derived averaged template to recognize each word. The variance template for each word is derived through the use of three exponentially related channels derived from two SAMDF functions, each of which are then amplitude and time normalized. The system, thus, distills out vocal tract variations but not dialectical variations.

As discussed above, although the method and apparatus of the present inventions has been described in detail with respect to speech processing applications, it should be appreciated that the techniques described herein are fully compatible with all types of signal processing applications. Accordingly, the scope of the present invention is not limited to the use of the system for generating speaker-independent templates for machine recognition of speech.

Although the invention has been described and illustrated in detail, it is clearly understood that the same is by way of illustration and example only and is not to be taken by way of limitation. The spirit and scope of the present invention are to be limited only by the terms of the appended claims.

I claim:

1. A method for processing an acoustic input speech signal for extraction of individual utterances comprising the steps of:
    (a) converting said speech signal into a first and second sequence of speech related samples;
    (b) correlating the first sequence of speech related samples to derive a first histogram representing the input speech signal;
    (c) correlating the second sequence of speech related samples to derive a second histogram representing the input speech signal;
    (d) compressing the first and second histograms to derive a plurality of spaced channels;
    (e) generating a compression histogram representing at least a part of the input speech signal from the spaced channels;
    (f) repeating steps (a)–(e) to generate a sequence of compression histograms said sequence of compression histogram representing a transformation of the input speech signal;
    (g) identifying end points for each utterance in the sequence of compression histograms; and
    (h) extracting individual utterances from the sequence of compression histograms between the identified utterance end points.

2. A method for processing an acoustic speech signal as in claim 1 wherein the step of converting the input speech signal comprises the steps of:
    filtering and digitizing the input speech signal to generate the first sequence of speech related samples; and
    filtering, digitizing, differentiating and peak clipping the input speech signal to generate the second sequence of speech related samples.

3. A method for processing an acoustic input speech signal as in claim 1 wherein the step of correlating the first sequence of speech related samples comprises the step of calculating the sliding average magnitude difference function (SAMDF) from the first sequence of speech related samples to derive measurements for the first histogram representing the input speech signal.

4. A method for processing an acoustic input speech signal as in claim 3 wherein the first histogram comprises at least four measurements.

5. A method for processing an acoustic input speech signal as in claim 4 wherein the step of correlating the second sequence of speech related samples comprises the step of calculating the sliding average magnitude difference function (SAMDF) from the second sequence of speech related samples to derive measurements for the second histogram representing the input speech signal.

6. A method for processing an acoustic input speech signal as in claim 5 wherein the second histogram comprises at least sixteen measurements.

7. A method for processing an acoustic input speech signal as in claim 6 wherein the step of compressing comprises the steps of:
    selecting the first four measurements from the first histogram comprising the first spaced channel;
    compressing the first eight measurements from the second histogram into four measurements by averaging adjacent measurements across the first eight measurements, the four measurements comprising the second spaced channel; and compressing the first sixteen measurements from the second histogram into four measurements by averaging four adjacent measurements at a time across the first sixteen measurements, the four measurements comprising the third spaced channel.

8. A method for processing an acoustic input speech signal as in claim 7 wherein the step of compressing further comprises the steps of:

averaging the amplitude of selected measurements in each of the three spaced channels to generate three amplitude averaged measurements; and averaging the amplitude of selected measurements across all three spaced channels to generate a fourth amplitude averaged measurement, the four amplitude averaged measurements comprising the fourth spaced channel.

9. A method for processing an acoustic input speech signal as in claim 8 wherein the step of identifying end points of an utterance in the sequence of compression histograms comprises the step of comparing on a histogram by histogram basis across the sequence of compression histograms the measurements in each spaced channel with a fixed threshold measurement to identify compression histograms indicative of unvoiced onset and offset.

10. A method for processing a sequence of histograms representing a transformation of an extracted portion of a time varying input signal for recognition of certain signal patterns within said extracted portion, each histogram in the sequence of histograms having a plurality of channels, each channel comprising a plurality of measurements, said method for processing comprising the steps of:

generating and storing a plurality of identification templates, each identification template representing a signal pattern to be identified;

time normalizing the sequence of histograms;

amplitude normalizing the sequence of histograms;

generating and storing a test template from the time and amplitude normalized histogram sequence; and comparing the identification templates with the test template for a match to identify the signal pattern.

11. A method for processing as in claim 10 wherein each identification template comprises a sequence of histograms, each histogram having at least four channels with at least four measurements per channel.

12. A method for processing as in claim 10 wherein the test template comprises a sequence of histograms, each histogram having at least four channels with at least four measurements per channel.

13. A method as in claim 10 wherein the step of generating the identification template representing a signal pattern further comprises the step of merging a plurality of the same signal pattern generated by a plurality of sources.

14. A method as in claim 10 wherein the step of time normalizing the sequence of histograms representing the transformation of the extracted portion of the time varying signal comprises the steps of:

detecting signal pattern beginning and end points for each extracted portion in the sequence of histograms; and calculating a center reference point in the sequence of histograms for each extracted portion.

15. A method as in claim 14 wherein the step of calculating a center reference point further comprises the steps of:

starting at the detected beginning point and ending at the detected end point, summing selected measurements in each channel across the sequence of histograms representing the signal pattern to obtain a first sum;

starting at the detected beginning point and ending at the detected end point, summing the selected measurements in each channel across the sequence of histograms representing the signal pattern to obtain a second sum until the second sum equals or exceeds one-half of the first sum to determine the position of the center reference point in the histogram sequence; and storing the location of the center reference point of the sequence of histograms representing the signal pattern.

16. A method as in claim 15 wherein the step of time normalizing the sequence of histograms representing the signal pattern further comprises the steps of:

time normalizing the sequence of histograms from the beginning point to said center reference point; and time normalizing the sequence of histograms from the center reference point to the end point.

17. A method as in claim 10 wherein the step of amplitude normalizing the sequence of histograms representing the signal pattern comprises the steps of:

amplitude normalizing each measurement within each histogram in the sequence of histograms and within each channel with a first algorithm;

amplitude normalizing each measurement in all channels across the sequence of histograms with a second algorithm; and amplitude normalizing selected measurements within each histogram in the sequence of with a third algorithm.

18. A method for processing as in claim 10 wherein the step of amplitude normalizing further comprises the steps of:

identifying an upper and lower value for selected measurements within each channel for each histogram in the sequence of histograms; and scaling each measurement within each channel for each histogram in the sequence of histograms between a fixed minimum and maximum value relative to the identified upper and lower values.

19. A method as in claim 18 wherein the step of amplitude normalizing further comprises the steps of:

scaling selected measurements in the first three channels in each histogram by each of the three algorithms;

rescaling the measurements in the first three channels in each histogram by each of the three algorithms; and scaling the measurements in the fourth channel by the first algorithm and rescaling the measurements in the fourth channel by the second algorithm.

20. A method for processing as in claim 10 wherein the step of comparing the identification and test templates for a match comprises the steps of:

(a) comparing the measurements for the test template to the measurements for the identification template on a channel by channel, histogram by histogram basis;

(b) generating a comparison score representing the value difference between the measurements for the test template and the identification template for each histogram in the sequence of histograms;

(c) adding each value difference for each histogram compared in the sequence of histograms to calculate a total difference score;

(d) repeating steps (a)-(c) for each identification template; and (e) outputting as a match the identification template that produces the lowest total difference score below a threshold level and no other comparisons produce scores close to the lowest score.

21. A method as in claim 10 further comprising the step of adapting the identification template when no match occurs between the test template and the identification template.

22. A method as in claim 21 wherein the step of adapting the identification template further comprises the steps of:

identifying intruding identification templates close to the identification template;

subtracting the test template from any identified intruding identification templates to minimize the influence of each intruding identification template;

updating the identification template with the test template; and updating the template for all intruding identification templates.

23. A method for extracting the information bearing portions of an acoustic speech signal comprising the steps of:

(a) digitizing the acoustic speech signal to produce a plurality of sequences of speech samples;

(b) correlating each sequence of speech samples to derive a histogram comprising a plurality of measurements;

(c) compressing the plurality of measurements for the histogram to generate a compression histogram representing at least a part of the acoustic speech signal, said step of compressing comprising the step of averaging selected measurements for the histogram to generate the measurements that comprise the compression histogram; and (d) repeating steps (a)-(c) to output a sequence of compression histograms representing a transformation of the acoustic speech signal.

24. A method for extracting the information bearing portions of an acoustic speech signal as in claim 23 further comprising the steps of:

identifying end points in the sequence of compression histograms to identify the information bearing portions of the acoustic speech signal; and extracting the information bearing portions from the sequence of compression histograms between detected end points.

25. A method for extracting as in claim 24 wherein the step of correlating comprises the step of calculating the sliding average magnitude difference function (SAMDF) for each sequence of speech samples to generate a histogram.

26. A method for extracting as in claim 24 wherein the step of detecting comprises the step of comparing on a histogram by histogram basis the value of each histogram in the sequence of compression histograms to a threshold value to determine instances of unvoiced onset and offset.

27. A method for extracting as in claim 23 wherein the step of digitizing comprises the steps of:

generating a first sequence of speech samples from a broadband digitized version of the acoustic speech signal; and generating a second sequence of data samples from a digitized, differentiated and infinitely clipped version of the acoustic speech signal.

28. A method for processing a sequence of histograms representing information bearing portions of an acoustic speech signal for recognition of individual utterances comprising the steps of:

storing a plurality of identification templates representing the individual utterances to be recognized;

time and amplitude normalizing the sequence of histograms;

generating a test template from the time and amplitude normalized sequence of histograms; and comparing the test template to the identification templates for matching and recognition.

29. A method for processing as in claim 28 wherein the step of time normalizing comprises the steps of:

identifying beginning and end points for each individual utterance in the sequence of histograms; and generating a center reference point for each individual utterance in the sequence of histograms.

30. A method for processing for recognition as in claim 29 wherein each histogram comprises a plurality of measurements and the step of generating a center reference point further comprises the steps of:

starting at the beginning point, combining selected measurements across the sequence of histograms to the end point to obtain a first sum; and starting at the beginning point, combining selected measurements across the sequence of histograms until a second sum equals or exceeds one-half of the first sum to generate the center reference point.

31. A method for processing as in claim 29 further comprising the steps of:

time normalizing each histogram in the sequence of histograms from the beginning point to the center reference point; and time normalizing each histogram in the sequence of histograms from the center reference point to the end point.

32. A method for processing as in claim 29 wherein each histogram comprises a plurality of measurements and amplitude normalization comprises the steps of:

identifying a maximum and a minimum value across selected measurements for the histograms in the sequence of histograms for each utterance with each of three algorithms; and scaling each selected measurement for the histograms in the sequence to a value between zero and fifteen relative to the located maximum and minimum values with each of three algorithms.

33. A method for processing as in claim 28 wherein the step of comparing comprises the steps of:

comparing on a histogram by histogram basis the normalized histogram sequence representing the test template with each of the stored histogram sequences representing the identification templates;

generating a value difference score between each histogram in the normalized and stored sequence of histograms;

combining each value difference score for each histogram in the sequence compared to generate a total difference score for each template comparison; and identifying as a match the vocabulary template that produces the lowest total difference score below a threshold level when no other comparisons produce scores below the threshold level.

34. A method as in claim 33 further comprising the step of adapting the identification template when no match occurs between the test template and the identification template.

35. A method as in claim 34 wherein the step of adapting the identification template further comprises the steps of:
   identifying identification templates having a match as against the test template for the unknown information-bearing portion of the input signal within a defined difference to the score of the correct identification template;
   subtracting the test template from the identified identification templates to reduce the influence of the identified identification templates; and
   updating the identification template having an identified match with the test template.

36. Apparatus for processing an acoustic speech signal for recognition of individual utterances comprising:
   (a) means for converting said speech signal into a first and second sequence of data samples;
   (b) means for correlating the first sequence of data samples into a first histogram representing the input speech signal, said first histogram comprising a plurality of data measurements;
   (c) means for correlating the second sequence of data samples into a second histogram representing the input speech signal, said second histogram comprising a plurality of data measurements;
   (d) means for selectively compressing the plurality of data measurements in the first and second histograms into a plurality of data channels, each data channel comprised of a plurality of data measurements, the total number of measurements in all channels being less than the total measurements in said first and second histograms; and
   (e) means for repeating steps (a)-(d) to produce a sequence of histograms within each data channel, said sequence of histograms representing a transformation of the speech signal.

37. The apparatus as in claim 36 further comprising:
   means for processing each histogram in the sequence of histograms to identify end points of individual utterances; and
   means for storing the individual utterances in the sequence of histograms between the detected end points.

38. Apparatus for processing a sequence of histograms representing a transformation of an utterance extracted from an acoustic speech signal, comprising:
   means for storing a vocabulary template representing the utterance to be processed;
   means for time and amplitude normalizing the sequence of histograms to generate a test template representing the extracted utterance; and
   means for comparing the vocabulary template to the test template for matching and recognition.

* * * * *